(12) United States Patent
Oshima et al.

(10) Patent No.: US 7,050,385 B2
(45) Date of Patent: May 23, 2006

(54) OPTICAL RECORDING MEDIUM

(75) Inventors: Noriaki Oshima, Yokohama (JP); Hideki Oono, Yonezawa (JP); Takashi Taniguchi, Sagamihara (JP); Keiichiro Nishizawa, Yokohama (JP)

(73) Assignee: Tosoh Corporation, Yamaguchi-ken (JP)

( * ) Notice: Subject to any disclaimer, the term of this patent is extended or adjusted under 35 U.S.C. 154(b) by 348 days.

(21) Appl. No.: 09/777,686

(22) Filed: Feb. 7, 2001

(65) Prior Publication Data
US 2002/0044523 A1 Apr. 18, 2002

(30) Foreign Application Priority Data

| | | | |
|---|---|---|---|
| Feb. 8, 2000 | (JP) | | 2000-035655 |
| Mar. 3, 2000 | (JP) | | 2000-063375 |
| Mar. 31, 2000 | (JP) | | 2000-101309 |
| Jun. 6, 2000 | (JP) | | 2000-174217 |

(51) Int. Cl.
*G11B 7/24* (2006.01)

(52) U.S. Cl. ............... 369/275.4; 369/275.1
(58) Field of Classification Search ............ 369/275.4, 369/275.1; G11B 7/24
See application file for complete search history.

(56) References Cited

U.S. PATENT DOCUMENTS

| | | | | |
|---|---|---|---|---|
| 5,199,023 A | * | 3/1993 | Yamamoto et al. | 369/275.4 |
| 5,602,824 A | * | 2/1997 | Ooki et al. | 369/275.4 |
| 6,154,326 A | * | 11/2000 | Ueyanagi et al. | 359/819 |
| 6,243,350 B1 | * | 6/2001 | Knight et al. | 369/126 |
| 6,359,852 B1 | * | 3/2002 | Ueyanagi | 369/118 |
| 6,366,541 B1 | * | 4/2002 | Ohnuki et al. | 369/13.35 |
| 6,587,427 B1 | * | 7/2003 | Medower | 369/275.4 |
| 6,704,250 B1 | * | 3/2004 | Ueyanagi | 369/13.33 |

FOREIGN PATENT DOCUMENTS

| | | |
|---|---|---|
| JP | 7-254180 | 10/1995 |
| JP | 11-134711 | 5/1999 |

OTHER PUBLICATIONS

B.D. Terris et al., "Near-field optical data storage", Appl. Phys. Lett. 68(2), Jan. 8, 1996, pp. 141-143.
Y. Sabi et al., "Noise Improvement for a High NA MO System", proceedings of Magneto-Optical Recording International Symposium '99, J. Magn. Soc. Jpn., vol. 23, Supplement, No. S1 (1999), pp. 269-272 © 1999 by The Magnetics Society of Japan.

* cited by examiner

*Primary Examiner*—A M Psitos
(74) *Attorney, Agent, or Firm*—Sughrue Mion, PLLC

(57) ABSTRACT

An optical recording medium comprising at least a land and a groove where information-recording/reproducing is carried out by a flying type optical head, The optical recording medium keeps the flying height of the flying optical head constant in the entire region of the recording/reproducing area, and is provided with at least one characteristic among the following characteristics: RP which is dependent on land and groove parameters and the flying height satisfies the relation of H>Rp 0.1 H; centerline mean roughness Ra is in the range of 0.2 nm Ra 2.0 nm, and the layer thickness of a liquid lubricant layer satisfies the relation of t Ra; the relation of $\Delta Rp \leq \lambda/16\ NA$ which is dependent on the effective numerical aperature, laser wavelength and surface parameters is satisfied where all parameters in the formula are defined in the specification; and the height of a header area is different from the height of a land portion.

13 Claims, 6 Drawing Sheets

WHERE H > Rp ≥ 0.1 H

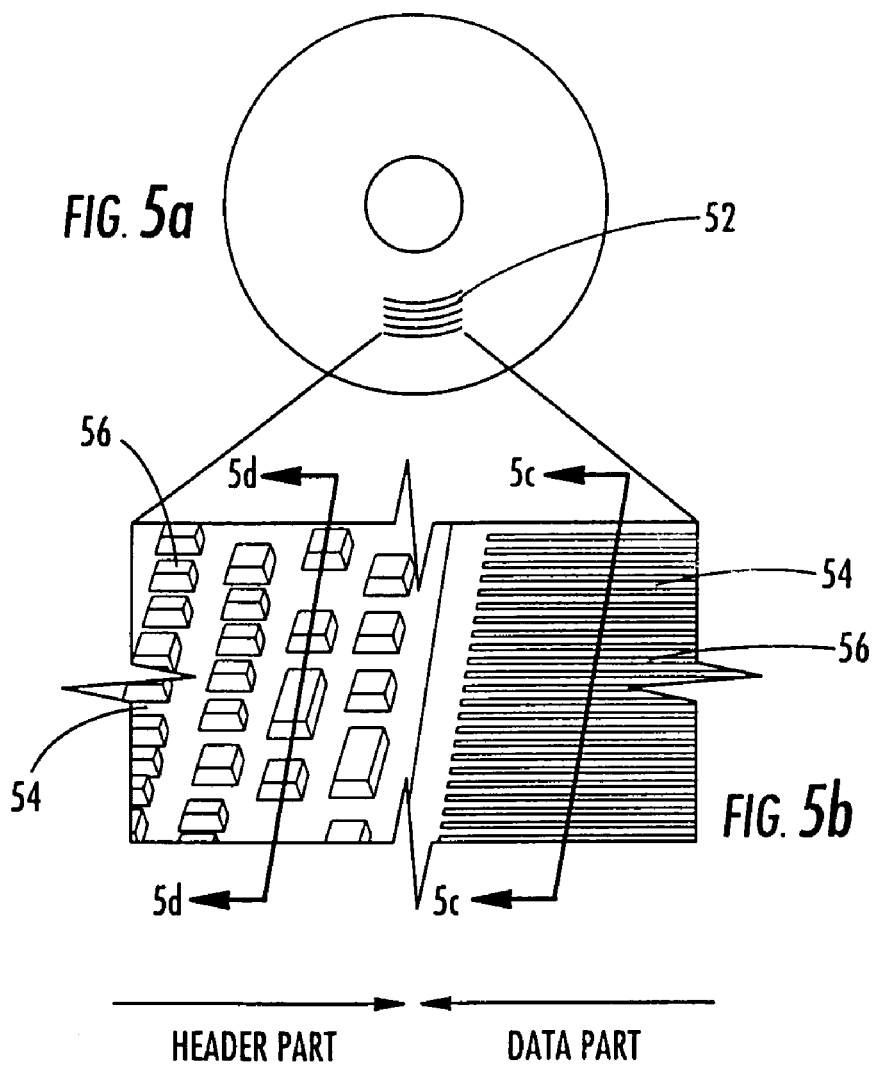
HEADER PART — DATA PART

HEADER PART ← → LAND PART

HEADER PART    LAND PART

HEADER PART    LAND PART

OPTICAL RECORDING MEDIUM

BACKGROUND OF THE INVENTION

1. Field of the Invention

The present invention relates to a rewritable optical recording medium capable of information-recording, reproducing and erasing according to a surface-recording/reproducing system by using a flying optical head.

2. Discussion of Background

An optical recording medium is a portable recording medium permitting large volume/high density recording, and there have been rapidly increasing demands of rewritable media for recording dynamic images and so on as large volume preserving files for computers in current fashion of multimedia.

In an optical recording medium, a guide groove (hereinbelow, referred to as a groove) for trucking, by the aid of a servo, laser beams to a position for recording/reproducing is generally formed in a physical shape in the substrate, and information is recorded in a convex portion (hereinbelow, referred to as a land) between grooves in the substrate.

Accordingly, as the land is made larger, it is possible to increase the width of marks for recording; the intensity of reproducing signals can be increased, and the quality of reproducing signals can be improved.

In order to perform high density recording, however, it is necessary to increase an information quantity per recording surface area by reducing the track pitch as the distance between grooves.

For example, in a commercialized magneto-optical recording medium of 3.5 inch diameter, the track pitch has been reduced to 1.6 μm in a recording medium having a recording capacity of 128 MB, 1.4 μm in that of 230 MB and 1.1 μm in that of 640 MB.

On the other hand, the recording density is limited by a laser beam spot size (~λ/NA) which is determined by a laser wavelength (λ) from a light source and a numerical aperture (NA) of an objective lens.

For example, in the recording/reproducing device for the above-mentioned 640 MB magneto-optical recording medium, the wavelength is 680 nm and NA is 0.55, and therefore, the laser beam spot size is about 1240 nm.

As means for reducing the laser beam spot size to achieve high density recording, a so-called near-field optical recording wherein recording/reproducing is conducted by bringing the optical head close to the recording layer, has been noted (e.g., (Appl. Phys. Lett.), vol. 68, p. 141 (1996)). In this recording method, a solid immersion lens (hereinbelow, referred to as "SIL") head is used, and recording/reproducing of super-high recording density can be realized by increasing an effective numerical aperture with use of SIL to thereby reduce the laser beam spot size.

For example, in the near-field optical recording using SIL having a wavelength of 650 nm and an effective NA of 1.4, the laser beam spot size is about 460 nm, which is about 37% of the laser beam spot size used in the before-mentioned conventional recording/reproducing device for 640 MB magneto-optical recording medium.

In this surface recording/reproducing method, it is necessary to bring the optical head close to the recording medium, and accordingly, laser beams are not irradiated to the recording layer through the substrate as in the conventional optical recording medium, but a method for irradiating directly laser beams to the recording layer without being passed through the substrate is used.

Namely, the structure of the recording layer in the conventional optical recording medium comprises generally substrate/first protective layer/recording layer/second protective layer/reflective layer. On the other hand, in the near-field optical recording, it has an layer structure, contrary to the above, of substrate/reflective layer/recording layer/protective layer so that recording/reproducing is carried out by irradiating laser beams from a layer surface side.

In this case, use of a flying slider head is proposed to bring the optical head close to the recording layer.

Generally, when a track pitch P is in a size as much as an optical spot, a groove as a guide groove functions as a diffraction grating, and the intensity distribution of the beam spot is changed by the effect of interference due to a track deviation in a region where the 0-order diffraction light and the first-order diffraction light overlap, whereby a tracking error signal can be detected.

The intensity of this signal is determined by the numerical aperture NA of an objective lens, a track pitch and the wavelength λ of laser beams, and it is known that the maximum tracking error signal is provided when the depth of a groove is λ/8 n (n: the refractive index of a substrate through which laser passes).

However, there were the following problems in the near-field optical recording system. Since the signal was obtained by a coupling effect by the optical head at neighboring position and the outermost surface of the disk in addition to the known diffraction effect, the signal largely varied depending on a flying height of the optical head. Further, with respect to designing of the depth of grooves, the optimum depth for the near-field optical recording could not be obtained by the conventional designing technique.

Further, the optical recording medium has a header area in which a header comprising convex bumps or concave pits having a format information is formed and a data area having a land and a groove used for tracking the optical head and recording/reproducing of data. The optical recording medium had such a problem that the flying height of the head in recording/reproducing fluctuated because the flying height of the head flying above the header area was different from the flying height of the head flying above the data area. In description of the present invention, the substrate in which a land and a groove are formed is referred to as the substrate having a land/groove structure, and the portion of a land and the portion of a groove in the data area are referred respectively to as the land portion and the groove portion.

Further, in the surface optical recording system, since it is necessary to bring the optical head close to the medium, a so-called head crush wherein the flying slider head hits the medium is apt to occur. Accordingly, if the surface of the recording medium has not sufficient lubricating properties, a slight change in the flying height of the flying optical head from the recording medium will cause the contact of the flying optical head to the recording medium, with the result that the head and the recording medium are broken. Further, since the laser spot diameter is small in recording/reproducing of the recording medium, noises of recording/reproducing signals become large if the surface roughness of the recording medium is large, whereby sufficient SNR can not be obtained and there is a trouble in recording/reproducing.

Thus, in the near-field recording medium according to the recording/reproducing system for which the flying slider head is used, it was difficult to keep the flying height of the flying optical head constant in the entire recording/reproducing region and to obtain an excellent recording/reproducing signal uniformly. Further, there was the problem that the flying optical head contacted the recording medium to thereby cause the breakage of the head and the recording medium. Thus, it was difficult to obtain the excellent recording/reproducing signal in view of reliability and durability.

SUMMARY OF THE INVENTION

It is an object of the present invention to provide a surface recording/reproducing type optical recording medium having high reliability and durability, which is capable of obtaining an excellent recording/reproducing signal uniformly by keeping the flying height of an flying optical head constant in the entire region of the recording/reproducing area, and preventing the head and the recording medium from being broken by the contact of the flying optical head to the recording medium.

Namely, in accordance with the optical recording medium in a first aspect of the present invention, there is provided an optical recording medium wherein at least a structure comprising a land and a groove, which takes part in recording/reproducing, is formed on a substrate, at least a reflective layer and a recording layer are formed on the substrate in this order, and information-recording/reproducing is carried out by a flying optical head, the optical recording medium being characterized in that when the depth from the maximum height of the land to the centerline of the land and the groove is represented by Rp and the flying height from the maximum height of the land to the optical head is represented by H in an optional length on the radius of the optical recording medium in a region for information-recording/reproducing, Rp satisfies the relation of H>Rp≧0.1 H. With the land/groove structure wherein Rp satisfies such relation, it is possible to maintain a preferred signal intensity and tracking characteristics.

According to the optical recording medium in a second aspect of the present invention, there is provided an optical recording medium wherein at least a reflective layer, a recording layer, a dielectric layer and a solid lubricant layer are formed on a substrate in this order and information-recording/reproducing is carried out by a flying optical head, the optical recording medium being characterized in that a centerline mean roughness Ra of a land and/or a groove formed in the recording medium is in a range of 0.2 nm≦Ra≦2.0 nm. By determining Ra in this range, stable flying characteristics of the flying optical head can be obtained, and a sufficient SNR can be obtained even when the laser spot diameter is reduced.

A liquid lubricant layer may be or may not be formed on the solid lubricant layer. However, when the liquid lubricant layer is formed on the outermost surface of the recording medium so that the layer thickness t of the lubricant layer satisfies the relation of t≦2 Ra, influence to the optical characteristics by the optical head, by the deposition of the liquid lubricant on a laser beam transmitting portion of the flying optical head in recording/reproducing, can be prevented.

Further, the agglomerated state of the liquid lubricant can be measured by profiling fragment ions of the lubricant by a secondary ion mass analyzer (TOF-SIMS). In this case, if the agglomerated state of the liquid lubricant obtained by analyzing a distribution of fragment ions with use of TOF-SIMS can be rendered to be 10 µm or less in diameter, influence to the optical characteristics by the optical head by the deposition of the liquid lubricant on the laser beam transmitting portion of the flying optical head in recording/reproducing, can be prevented.

According to the optical recording medium in a third aspect of the present invention, there is provided an optical recording medium wherein at least a reflective layer and a recording layer are formed in this order on a substrate in which a land and a groove for data-recording/reproducing and a header area are provided, and information-recording/reproducing is carried out by a flying optical head, the optical recording medium being characterized in that when the effective numerical aperture of the optical head used is represented by NA, the wavelength of laser used is represented by λ, the depth from the maximum height of the surface of the recording medium to the centerline of the header is represented by Rph and the depth from the maximum height of the surface of the recording medium to the centerline of the land and the groove is represented by Rpd in an optional length on the radius of the optical recording medium in a region for information-recording/reproducing, the optical recording medium has a shape in its surface satisfying the relation of ΔRp≦λ/16 NA where ΔRp represents the absolute value obtained by subtracting the minimum value of Rpd from the maximum value of Rph or the absolute value obtained by subtracting the minimum value of Rph from the maximum value of Rpd, whichever larger, the values of Rph and Rpd being obtained by measuring at plural positions. With the satisfaction of such relation by ΔRp, stable flying characteristics of the flying optical head can be obtained in the entire information-recording/reproducing region of the optical recording medium.

According to the optical recording medium in a fourth aspect of the present invention, there is provided an optical recording medium wherein at least a land portion and a groove portion, which takes part in recording/reproducing, and a header area for recording a format information are formed in a substrate; information is recorded in at least the land portion, and information-recording/reproducing is carried out, the optical recording medium being characterized in that the height of the header area is different from the height of the land portion. By rendering the height of the header area to be different from the height of the land portion, it is possible to detect the timing of laser beams for recording/reproducing entering in the header area.

When a plastic substrate obtained by molding a thermoplastic resin is used for fabricating the optical recording medium of the present invention, light showing the strongest relative intensity between wavelengths 350–1500 nm is irradiated to the front surface of the substrate, whereby noises caused by the surface roughness of the substrate can be reduced.

BRIEF DESCRIPTION OF THE DRAWINGS

FIG. 5(a) shows an optical recording medium 50 in accordance with the present invention wherein concave or groove parts located at 52 are shown in more detail in FIG. 5(b).

In FIG. 5(b), black parts 54 representing concave or groove parts and white-gray parts 56 representing protruding parts are shown.

EXPLANATION OF REFERENCE NUMERALS

11: Groove, 12: Land, 13: Flying optical head, 14: Flying height, 15: Depth Rp from the maximum height of the front surface of the recording medium to the centerline of a land and a groove, 21, 31, 41: Substrate, 22, 32, 42: Reflective layer, 23: Recording layer, 33, 43: First dielectric layer, 34, 44: Magneto-optical recording layer, 24: Dielectric layer, 35, 45: Second dielectric layer, 25, 36, 46: Solid lubricant layer, 26, 37, 47: Liquid lubricant layer

DETAILED DESCRIPTION OF THE PREFERRED EMBODIMENTS

It is an object of the present invention to provide a surface recording/reproducing type optical recording medium having high reliability and durability, which is capable of obtaining an excellent recording/reproducing signal uniformly by keeping the flying height of a flying optical head constant in the entire recording/reproducing region, and preventing the head and the recording medium from being broken by the contact of the flying optical head to the recording medium. The optical recording medium has at least one characteristic feature among the characteristic features described below.

The first characteristic feature of the optical recording medium of the present invention resides in an optical recording medium wherein at least a structure comprising a land and a groove, which takes part in recording/reproducing, is formed on a substrate, at least a reflective layer and a recording layer are formed on the substrate in this order, and information-recording/reproducing is carried out by a flying optical head, the optical recording medium being characterized in that when the depth from the maximum height of the land to the centerline of the land and the groove is represented by Rp and the flying height from the maximum height of the land to the optical head is represented by H in an optional length on the radius of the optical recording medium in a region for information-recording/reproducing, Rp satisfies the relation of $H > Rp \geq 0.1\ H$.

Rp and H have preferably the relation of $0.8\ H \geq Rp \geq 0.1\ H$, more preferably, $0.5\ H \geq Rp \geq 0.1\ H$. When Rp exceeds the flying height H, the flying optical head will contact the land portion, and stable flying is impossible. In consideration of a defect in the shape of the land or the presence of foreign matters or the like, Rp is preferably 0.8 H or less. On the other hand, when Rp is less than 0.1 H, it is difficult to take a tracking signal, and the effect of the groove as a guide groove can not be expected.

Figure 1:
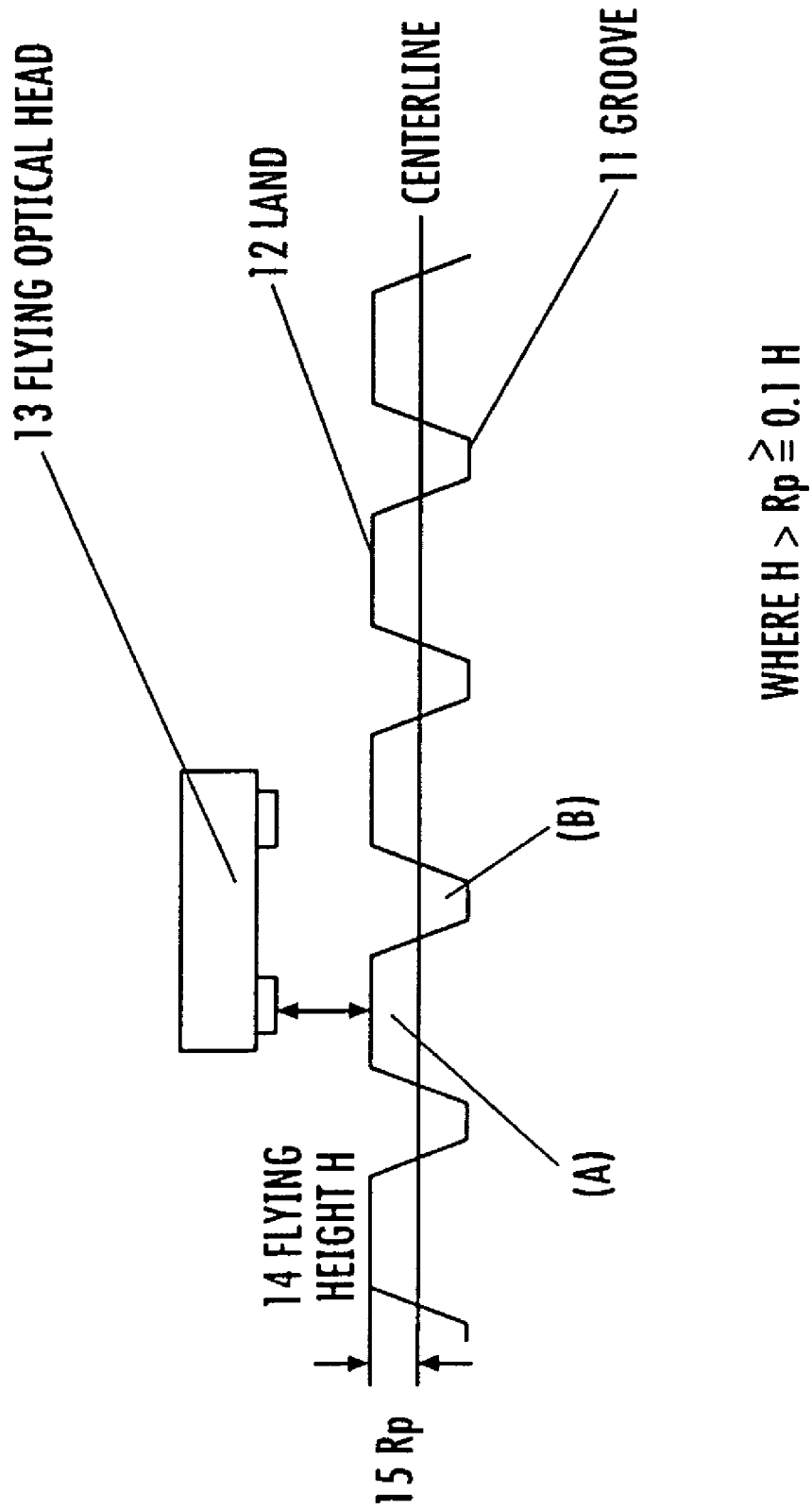
FIG. 1 is a diagram showing in cross section an embodiment of the optical recording medium of the present invention and explaining the centerline of lands and grooves of the present invention. The centerline of the lands and grooves means a straight line such that when a single straight line is drawn to a roughness curve of the data area having the lands and grooves, surface areas surrounded by the straight line and the roughness curve are equal at both sides of the straight line. Namely, it is meant that the surface area of (A) and the surface area of (B) at opposite sides with respect to the straight line (centerline) in FIG. 1 are equal.

The centerline of the lands and grooves in the present invention means a straight line such that when a single straight line is drawn to a roughness curve along lands and grooves in an optional length on the radius of the optical recording medium in a region for information-recording/reproducing, the surface areas surrounded by the straight line and the roughness curve are equal at both sides of the straight line. Specifically, it is meant that the surface area of (A) and the surface area of (B) opposing with respect to the centerline in FIG. 1 are equal. Further, the centerline of lands and grooves or the maximum height of lands are determined based on an optional length on the radius of the optical recording medium in a region where the recording/reproducing of information is conducted. The optional length should be 2–100 times, preferably 10–50 times as much as the track pitch, although it varies depending on a size of the track pitch. With such, conditions of the land and the groove in the optical recording medium are reflected to Rp and so on. Further, the optional length may be at any optional position as long as it is within the recording/reproducing region of the optical recording medium.

The centerline of the lands and the grooves or the maximum height of the lands can be obtained by measuring a portion having an optional length in cross-sectional view of the optical recording medium with use of a scanning electronic microscope (SEM) having a magnification of 2000–4000 or an atomic force microscope (AFM). Further, the flying height of the optical head can be measured by rotating an optical recording medium to float the optical head.

The second characteristic feature of the optical recording medium of the present invention resides in an optical recording medium wherein at least a reflective layer, a recording layer, a dielectric layer and a solid lubricant layer are formed on a substrate in this order and information-recording/reproducing is carried out by a flying optical head, the optical recording medium being characterized in that a centerline mean roughness Ra of a land and/or a groove formed in the recording medium is in a range of $0.2\ \text{nm} \leq Ra \leq 2.0\ \text{nm}$.

In the recording region of the optical recording medium of the present invention, a land(s) and a groove(s) are formed to control the tracking of the optical head generating laser spot beams when it flies above the recording medium. Recording/reproducing with respect to the optical recording medium may be conducted only to land portions, only to groove portions, or to both the land portions and the groove portions. Accordingly, Ra of the land portions and the groove portions is preferably in a range of 0.2 nm≦Ra≦2.0 nm, more preferably, 0.5 nm≦Ra≦1.5 nm. When Ra is less than 0.2 nm, the lubricating properties of the front surface of the recording medium are poor, whereby the flying height of the optical head such as SIL head or the like fluctuates. Accordingly, if SIL head contacts the recording medium, crushing of SIL head or the recording medium is apt to occur. Further, when Ra exceeds 2.0 nm, the noise level of recording/reproducing signals becomes large whereby SNR decreases and an error rate increases, with the result that there is a problem of reduction in recording capacity, in the worst case, recording/reproducing being impossible. Ra in the front surface of the recording medium can be controlled by changing the layer thickness of each of the reflective layer, the recording layer, the dielectric layer and the solid lubricant layer when they are formed, or by changing the partial pressure of gas when they are formed by sputtering methods.

The liquid lubricant may be or may not be formed on the solid lubricant layer. However, from the viewpoint of using the flying optical head, it is desirable to form the liquid lubricant layer on the outermost surface of the recording medium.

It is preferable that the layer thickness of the liquid lubricant layer is not less than 0.3 nm but not more than 4.0 nm. Further, it is preferable that the layer thickness t of the liquid lubricant layer satisfies the relation of t≦2 Ra where Ra indicates an average roughness of the centerline of the recording medium having a layer structure up to the solid lubricant layer on the substrate, more preferably, the layer thickness t satisfies the relation of t≦1.5 Ra. If the layer thickness t of the liquid lubricant layer exceeds 2 Ra, and the SIL head contacts the recording medium due to a change in the flying height of the flying optical head from the recording medium, it is difficult that the SIL head flies again above the recording medium. Further, the liquid lubricant scatters from the recording medium rotated in recording/reproducing, and the scattered lubricant is apt to deposit on the SIL head. If the liquid lubricant adheres on the front surface of the lens of SIL head through which laser beams pass, the intensity of output laser beams or the intensity of input laser beams is reduced whereby the durability of SIL head is remarkably reduced.

The agglomerated state of the liquid lubricant can be measured by profiling fragment ions of the lubricant by the secondary ion mass analyzer (TOF-SIMS). In the liquid lubricant layer of the optical recording medium of the present invention, it is preferable that the agglomerated state of the liquid lubricant obtained by analyzing a distribution of fragment ions of the lubricant with use of TOF-SIMS shows 10 μm or less in diameter.

When the agglomerated state of the liquid lubricant exceeds 10 μm in diameter, there takes place occurrence of the deposition of the lubricant on the front surface of the optical head in repeated recording/reproducing operations by the flying optical head, whereby the front surface of the optical head is stained and a defect in recording/reproducing is resulted.

In order to render the agglomerated state of the liquid lubricant to be 10 μm or less, it is preferable to form a layer composed of a perfluoropolyether derivative on the front surface of an optical recording medium having, for example, a spiral guide groove (groove) or concentric guide grooves in a thickness of not less than 0.3 nm but less than 2.0 nm, more preferably, 0.5 nm–1.8 nm.

With such groove structure, the liquid lubricant is dispersed uniformly on the front surface of the recording medium, and an excessive liquid lubricant accumulates in a lower portion of the groove(s) while an upper portion of the groove(s) is covered with the lubricant at the minimum necessary for lubrication. Accordingly, even when recording/reproducing operations are repeated by the flying head with an optical head, abnormality in terms of optics due to the adhesion of the lubricant on the optical head does not occur, and stable recording/reproducing/erasing characteristics can be obtained.

When the layer thickness of the liquid lubricant is less than 0.3 nm, sufficient lubrication characteristics can not be obtained, and a flaw is easily caused on the front surface of the recording medium by the flying optical head. When the layer thickness of the liquid lubricant is 2.0 nm or more, there is no problem in lubrication characteristics, however, the proportion of free lubricant molecules which are not adsorbed in the surface of the recording medium is increased so that the state of dispersion exceeds 10 μm in diameter.

It is preferable that the depth of the groove(s) is 20 nm–150 nm after the formation of the solid lubricant layer. When the depth of the groove(s) is less than 20 nm, an amount of the lubricant accumulated in a lower portion of the groove(s) is insufficient. When an excessive lubricant exists in an upper portion of the groove(s), the agglomerated state of the lubricant exceeds 10 μm in diameter. When the depth of the groove(s) exceeds 150 nm, the covering of the upper portion of the groove(s) by the lubricant layer is insufficient although the diameter of the lubricant in an agglomerated state is 10 μm or less, and crushing of the flying optical head is apt to occur.

Although the distance between grooves, i.e., the track pitch is not, in particular, limited, it is preferably 1.6 μm or less because it takes part in recording/reproducing of data.

The third characteristic feature of the optical recording medium of the present invention resides in an optical recording medium wherein at least a reflective layer and a recording layer are formed in this order on a substrate in which a land and a groove for data-recording/reproducing and a header area are provided, and information-recording/reproducing is carried out by an optical head, the optical recording medium being characterized in that when the effective numerical aperture of the optical head used is represented by NA, the wavelength of laser used is represented by λ, the depth from the maximum height of the surface of the recording medium to the centerline of the header is represented by Rph and the depth from the maximum height of the surface of the recording medium to the centerline of the land and the groove is represented by Rpd in an optional length on the radius of the optical recording medium in a region for information-recording/reproducing, the optical recording medium has a shape in its surface satisfying the relation of ΔRp≦λ/16 NA where ΔRp represents the absolute value obtained by subtracting the minimum value of Rpd from the maximum value of Rph or the absolute value obtained by subtracting the minimum value of Rph from the maximum value of Rpd, whichever larger, the values of Rph and Rpd being obtained by measuring at plural positions.

FIG. 1 shows diagrammatically the shape in cross section of an embodiment of the optical recording medium of the present invention. In a recording/reproducing surface of the optical recording medium, a groove 11 is formed in a spiral form for laser tracking. Convex-type lands 12 are formed between grooves. Further, a header having a format information (not shown) is formed in the recording/reproducing surface. It should be noted that FIG. 1 does not indicate correctly relative size/height of the optical head, lands and grooves and so on.

As an optical recording/reproducing system, there are a groove recording system in which data are written in a groove and a land recording system in which data are written in a land. In either recording system, it is important that the flying height 14 of a head 13 from a plane, as standard, in which data are written should be constant in order to conduct recording/reproducing. When the head flies above the recording medium, the shape of the front surface of the recording medium influences largely the flying height of the head. Namely, the flying height of the head varies depending on the depth Rpd from the maximum height of the surface of the recording medium to the centerline of the land and the groove (Rp in figure) and the depth Rph from said maximum height to the centerline of the header (not shown).

The centerline of the land and the groove is a straight line, in the same manner as the case of the first characteristic feature of the present invention, such that when a single straight line is drawn to a roughness curve of lands and grooves in an optional length on the radius of the optical recording medium in a region of recording/reproducing of information, the surface areas surrounded by the straight line and the roughness curve at both sides of the straight line are equal. Further, the centerline of the header is a straight line with respect to a roughness curve of the header in the same manner as above.

The centerline of the land and the groove, the centerline of the header, and the maximum height of the land or the header, i.e., the maximum height of the surface of the recording medium are determined in an optional length on the radius of the optical recording medium in a region for recording/reproducing information.

The optional length, which varies depending on the track pitch, is 2–100 times, preferably, 10–50 times as much as the track pitch, whereby conditions of the land and the groove or the header of the optical recording medium are reflected to Rpd, Rph and so on. Further, the optional length may be determined at any optional position as long as it is in a recording/reproducing region of the optical recording medium.

The centerline of the land and the groove, the centerline of the header and the maximum height of the surface of the recording medium can be measured by a scanning electron microscope (SEM) having a magnification of 2000–4000 or an atomic force microscope (AFM) in an optional length portion in the shape in cross section of the optical recording medium, in the same manner as in the case of the first characteristic features of the present invention.

It is more preferable that the above-mentioned $\Delta$Rp satisfies the relation of $\Delta Rp \leq \lambda/20$ NA in order to obtain a uniform recording/reproducing signal intensity having smaller fluctuation.

In particular, since the shape of the surface of the header area of the recording medium is different from that of the data area, it is important to minimize the difference between Rph of the header area and Rpd of the data area so that the flying height of the flying head does not fluctuate when the head enters into the header area. The fluctuation of the flying head should be suppressed to such an extent that crushing does not occur by the contact of the head to the recording medium.

As a preferred method for reducing $\Delta$Rp, it is preferable that convex bumps and/or concave pits are formed in the header area of the substrate, and the depth Rph from the maximum height of the surface of the medium to the centerline of the header and the depth Rpd from the maximum height of the surface of the medium to the centerline of the land and the groove have the relation of $|Rph-Rpd| \leq \lambda/16$ NA. Further, they preferably have the relation of $|Rph-Rpd| \leq \lambda/20$ NA which makes fluctuation smaller. Rph of the header area can be adjusted by changing the surface area, the depth and the height of pits to be formed.

Further, it is preferable to form a groove in the header area wherein the relation of $|Rph-Rpd| \leq \lambda/16$ NA is satisfied. Further, it is preferable to provide $|Rph-Rpd| \leq \lambda/20$ NA in order to make fluctuation smaller and to obtain a uniform recording/reproducing signal intensity. The shape of the groove to be formed may be either in a circumferential direction or a radial direction, or both directions with respect to the center of recording medium. Rph can be adjusted by changing the depth and the width of the groove.

By satisfying such conditions, a highly reliable optical recording medium can be obtained wherein the flying height of the head in the entire recording/reproducing region is made constant; a uniform recording/reproducing signal can be obtained, and the crushing to the head seldom occurs.

The fourth characteristic feature of the optical recording medium of the present invention resides in an optical recording medium wherein at least a land portion and a groove portion, which takes part in recording/reproducing, and a header area for recording a format information are formed in a substrate; information is recorded in at least the land portion, and information-recording/reproducing is carried out, the optical recording medium being characterized in that the height of the header area is different from the height of the land portion.

By providing a difference in elevation between the height of the header area and the height of the land portion and using a detector of division type detecting system, there is obtainable an optical recording medium capable of detecting the timing of starting of operation in the header area when the optical head has entered from the data area to the header area.

Further, in recording information in the data area comprising lands and grooves, it is generally necessary to increase laser output. Therefore, a phenomenon that the wavelength of laser shifts toward a side of long wavelength takes place. On the other hand, at the time point that the optical head enters from the data area to the header area in which a format information is recorded, it is necessary to reduce the output of laser in order to read out the format information. In this case, there arises a problem of causing defocusing if the height of the data area is equal to the height of the header area because the wavelength of the laser returns to the original wavelength. To solve this problem, it is necessary to reduce the weight of the optical head and increase the response speed. Alternatively, the defocusing can be corrected by providing a difference in elevation between the height of the header area and the height of the land portion.

The difference in height between the header area and the land portion in the present invention is preferably from 3 nm to 100 nm. When the difference in height is less than 3 nm, defocusing by a shift of laser wavelength, which is caused by a difference of laser output between the time of recording and the time of reproducing, can not be corrected, and the intensity of a height-difference signal indicating a difference in height between the header area and the land portion, which is sufficiently detected by a division type detector, can not be obtained, whereby it is impossible to detect the timing of the optical head entering into the header area.

On the other hand, when the difference in height exceeds 100 nm, the defocusing of laser has to be corrected in the data area and the header area respectively, and the stability of flying of the flying optical head used in the surface recording/reproducing system is lost, whereby head crushing may occur.

In the present invention, it is sufficient that the height of the header area is different from the height of the land portion. Specifically, the height of the header area may be higher than the height of the land portion, or the height of the header area may be lower than the height of the land portion. "The height" in the present invention means "the height" from the lowermost portion of groove portions as standard. When the header area has no groove portion, the lowermost portion of the groove portion existing in a circumferential direction with respect to the header area is taken as standard as the height of the header area. The height of the header area should be different from the height of the land portion.

The difference in height between the header area and the data area in the present invention may be formed by a 2 P method with use of a stamper having a height-difference structure or an injection molding method. Or, after a disk without having a difference in height is produced by injection molding, the data area is partially molten by heat or irradiation of light to thereby make the height of the data area lower than the height of the header area.

The optical recording medium of the present invention may possess any of the above-mentioned first to fourth characteristic features solely, or may possess two or more characteristic features in combination optionally. Further, all the characteristic features may be possessed in combination of these characteristic features. In the later case, respective effect by these characteristic features can be obtained complexly. Further, when certain characteristic features have the same effect, such effect can further be increased.

The optical recording medium of the present invention can be preferably used for an optical recording medium according to a surface recording/reproducing system wherein recording and/or reproducing is conducted by irradiating laser light to the recording layer without passing through the substrate, i.e., without passing through the substrate from a side at which the recording layer and so on are formed, in particular, for a near-field optical recording medium using near-field light. In particular, it is preferably used as a near-field magneto-optical recording medium using a magneto-optical recording system, as a recording system. Further, with respect to the shape of the recording medium, an optical recording disk having a circular disk-like shape is preferred.

The recording system for the optical recording medium of the present invention is not in particular limited as far as it is a recording system capable of recording by a change of the polarization plane, the reflectance, the phase of light, such as a magneto-optical recording system comprising a recording layer such as TbFeCo, DyFeCo, GdTbFeCo, NdDyFeCo or the like, or a phase-change recording system comprising a recording layer such as GeSbTe, AgInSbTe or the like.

Further, in fabricating the optical recording medium of the present invention, when a plastic substrate obtained by molding a thermoplastic resin is used, light indicating the strongest relative intensity between wavelengths 350–1500 nm is irradiated to the surface of the substrate, whereby noises caused by the surface roughness of the substrate can be reduced.

In a high recording density recording system, study has been made to increase the numerical aperture of the optical lens. However, a reduction of C/N due to noise components which are caused by the surface roughness of the substrate as the numerical aperture is increased becomes troublesome. In particular, in a near-field optical recording system, such phenomenon is remarkable, and the reduction of noise components resulted from the surface roughness of the substrate is required as a very important technique. By reducing the noise components, excellent recording/reproducing characteristics can be obtained.

In recent years, there is a report that noises can be reduced by irradiating light to the substrate of an optical recording medium by using a UV ozone cleaner with a low pressure mercury lamp (Journal of the Magnetics Society of Japan, vol. 23, Supplement, No, S1 (1999) MORIS '99). The mechanism described is as follows. By irradiating light from a low pressure mercury lamp of a U.V. ozone cleaner, active oxygen species are produced from oxygen in air whereby the linkage of the polymer on the surface of the substrate is cut and decomposed for ashing. As a result, the surface roughness of the substrate is smoothened when a part of the substrate material is decomposed to decrease, and noises resulted from the surface roughness are reduced whereby C/N and the jitter of the magneto-optical recording medium fabricated by using the substrate can be improved.

However, in the above-mentioned treatment to the substrate, adhesiveness between the substrate and the recording layer decreases remarkably due to a reduction of molecular weight which is caused by the decomposition of the surface of the substrate, whereby the peeling-off of the recording layer takes place and the mechanical strength of the substrate decreases due to a low molecular weight which is caused by the irradiation of light from the low pressure mercury lamp with the result of cutting the linkage of polymer in the substrate. Accordingly, the substrate can not be used practically.

Namely, when light of a ultraviolet region is used as irradiation light, there is a large possibility of cutting the bond of the molecules of the plastic substrate. In particular, when light in a far ultraviolet ray region having a wavelength of less than 300 nm is irradiated to the substrate, very active ozone is generated by photoreaction with oxygen in air, whereby oxidative destruction of the substrate surface is resulted, and the bond of polymer constituting the substrate is cut, with the result of reducing the molecular weight of the substrate.

When the recording layer and so on are formed on the substrate having a low molecular weight, the peeling-off of the recording layer is apt to occur. Further, the mechanical strength of the substrate itself decreases whereby a defect such as cracking is generated in the substrate in an acceleration durability test.

As the light source for emitting light suitable for irradiation in order to reduce noises due to the surface roughness of the substrate, super-high pressure mercury lamp, high pressure mercury lamp, flash UV lamp, metal halide lamp, xenon lap, fluorescent lamp, arc lamp or halogen lamp can be exemplified.

On the other hand, since a large amount of far ultraviolet rays is contained in light emitting from low pressure mercury lamp, deep UV lamp, deuterium lamp or the like, they can not be used as the light source in the present invention without contrivance.

In the present invention, the substrate is heated by irradiating light. In this case, it is preferable that the temperature on the surface of the substrate is 80° C.–150° C. When the substrate surface temperature is less than 80° C., it is insuffcieint to make the surface roughness of the substrate flat by heating, and it is not effective to reduce the noises.

When the substrate surface temperature exceeds 150° C., the mechanical properties of the substrate itself become poor in addition to the groove being collapsed due to the molten substrate surface, so that it is impossible to use.

The liquid lubricant layer used for the optical recording medium of the present invention is not in particular limited as long as a material having a lubricating performance such as perfluoropolyether or the like is used. For example, alcohol-modified perfluoropolyether, ester-modified perfluoropolyether, isocyanate-modified perfluoropolyether, carboxyl-group-modified perfluoropolyether, piperonyl-modified perfluoropolyether or the like may be mentioned.

Although the main chain structure of the perfluoropolyether may be either a linear chain structure or a side chain structure, the linear chain structure is in particular preferred in view of lubricating properties. As the structure of its derivative, such one having a functional group such as an ester group (—COOR), a piperonyl group (3,4-methylenedioxybenzyl) or the like at both terminals or an end of the main chain is preferred.

As the ester group, a $C_{1-10}$ alkyl group which may be substituted can be exemplified. Although such a functional group may be introduced to either both terminals or one end of the molecule, it is particularly desirable that the functional group exists at both terminals because of its higher adsorption strength to the underlayer.

The weight average molecular weight of the perfluoropolyether derivative is from 1000 to 10000, more preferably, from 2000 to 10000. If the weight average molecular weight is less than 1000, the fluidity tends to be too high and the distribution on the medium surface is apt to be nonuniform. If the weight average molecular weight exceeds 10000, the fluidity tends to be too low and it is difficult to obtain sufficient lubricating properties. Further, in the derivative having a low molecular weight in comparison with that having a high molecular weight, the weight reduction due to thermal decomposition takes place from a lower temperature. Accordingly, the derivative having a higher molecular weight is superior in a long-term stability.

As such perfluoropolyether derivative, "Fomblin Z DEAL" and "Fomblin AM-2001" (tradename) manufactured by Ausimont Company and "DEMNUM SP" and "DEMNUM SY-3" (tradename) manufactured by Daikin can be mentioned, for example. "Fomblin Z DEAL" has ester groups at both terminals and "Fomblin AM-2001" has piperonyl groups at both terminals, and they are compounds each having —[(O—$CF_2$—$CF_2$)$_p$—(O)—$CF_2$)$_g$]— as the main chain.

Further, "DEMNUM SP" and "DEMNUM SY-3" have an ester group at one terminal and they are compounds having F—($CF_2$—$CF_2$—$CF_2$—O)$_n$— as the main chain.

It is preferable that the remaining layer thickness of the lubricant layer after the optical recording medium of the present invention has been immersed in a solvent for dissolving the perfluoropolyether derivative, is 60% or more of the layer thickness before the immersion. As the solvent for dissolving the perfluoropolyether derivative, a perfluoropolyether type solvent or a perfluorocarbon type solvent may be mentioned.

It can be said that as the proportion of the remaining layer thickness of the lubricant layer after it has been immersed in a solvent for dissolving the perfluoropolyether derivative is large, there is much liquid lubricant molecules adsorbed in the surface of the solid lubricant layer. When the proportion of the remaining layer thickness is less than 60%, there is no problem in lubricating properties. However, since there are many free liquid lubricant molecules which are not adsorbed in the surface of the solid lubricant layer, lubricant molecules deposited on and transferred to the flying optical head are recognized when the flying optical head contacts the recording medium. Although the liquid lubricant molecules deposited on the flying optical head are decomposed by heat generated from laser or the like, a part of the molecules may change in quality depending on the structure thereof and a colored residue may be produced. When the residue deposits on the lens, the transmittance decreases and the characteristics of the optical system are deteriorated.

As a method for increasing the proportion of the remaining layer thickness of the lubricant layer after it has been immersed in the solvent for dissolving the perfluoropolyether derivative, there is a method that the lubricant layer is once formed, and then, the surface of the layer is washed by a solvent for dissolving the perfluoropolyether derivative whereby the free liquid lubricant molecules which are not adsorbed to a lubricating underlayer are removed.

Further, it is preferable that the contact angle of water to the surface of the lubricant layer of the optical recording medium of the present invention is 70° or more.

When the contact angle of water to the surface of the lubricant layer is less than 70°, a much amount of water molecules in air is absorbed in the surface of the medium. Accordingly, the adsorbed moisture enters into a defective portion in the recording layer to cause corrosion easily. When the contact angle of water at the surface is 70° or more, such problem does not occur because water molecules are not adsorbed in the surface of the medium.

The lubricant layer of the optical recording medium of the present invention may comprise a perfluoropolyether derivative or a fluorine type polymer having at least one fluorine atom in the monomer structure or a compatibilized product thereof. Even when these materials for the lubricant layer are used, the contact angle of water to the lubricant layer changes depending on the material used, the layer thickness of the lubricant layer and conditions for coating. Accordingly, it is preferable to adjust the contact angle to be 70° or more.

Figure 2:
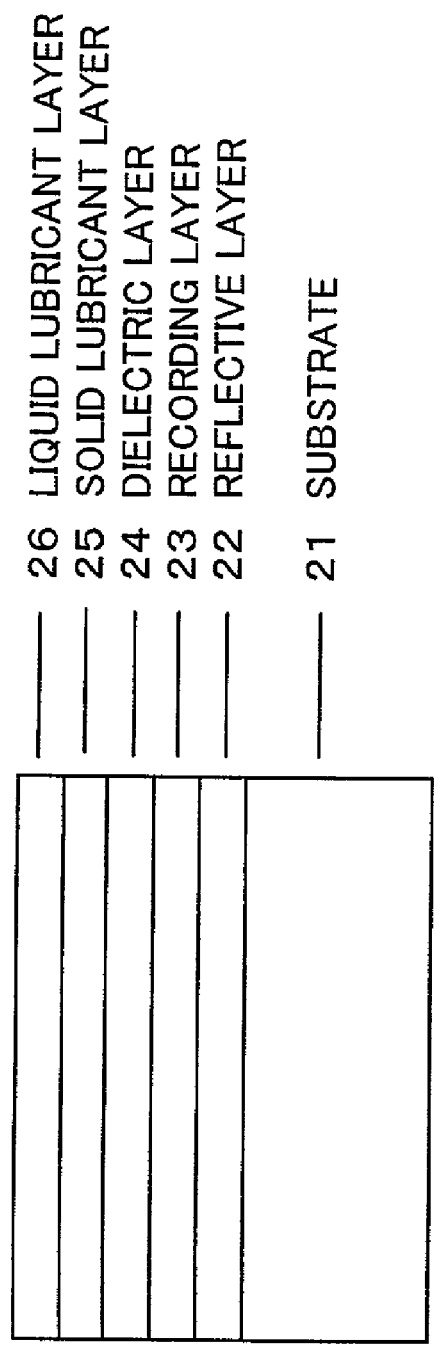
FIG. 2 is a partial cross-sectional view showing diagrammatically an embodiment of the construction of the optical recording medium of the present invention. The figure shows that a reflective layer 22, a recording layer 23, a dielectric layer 24, a solid lubricant layer 25 and a liquid lubricant layer 26 are formed in this order on a substrate 21.

FIG. 2 is a cross-sectional view showing diagrammatically an embodiment of the structure of the optical recording medium of the present invention. A reflective layer 22, a recording layer 23, a dielectric layer 24, a solid lubricant layer 25 and a liquid lubricant layer 26 are laminated on a substrate 21 in this order.

There is no limitation to the substrate 21 as far as it has the above-mentioned land/groove structure.

As resin for injection molding, there is no special limitation as far as it is a thermoplastic resin satisfying the properties of an optical disk substrate, such as mechanical properties, transferring properties and so on. For example, transparent plastics such as polycarbonate, polymethyl methacrylate, amorphous polyolefin or the like or so-called super engineering plastics such as polyphenylene sulfide, polyallylate, polyether ketone, polyether ether ketone or the like, may be used.

Further, there is no problem in preparing the substrate by so-called 2P method wherein the land/groove structure is formed in photopolymer on a glass plate or a flat metal plate.

There is in particular no limitation to the reflective layer 22 as far as metal having a high reflectivity is used. For example, metal such as Al, Ag, Au, Cu or the like may be used solely, or an alloy containing any of them as the main component may be used.

The recording layer 23 is constituted by a layer capable of recording by a change of the polarization plane, the reflectivity, the phase of light and so on, e.g., a magneto-optical recording layer such as TbFeCo, DyFeCo, GdTbFeCo, NdDyFeCo or the like, or a phase-change recording layer such as GeSbTe, AgInSbTe or the like. The recording layer 23 may be a single layer or a laminated layer formed by laminating layers having different function or composition.

As the dielectric layer 24, AlN, SiN, $Ta_2O_5$, ZnS—$SiO_2$ or the like may be used.

The reflective layer, the recording layer and the dielectric layer can be formed by a thin film forming method such as a sputtering method or a vacuum deposition method or the like.

As the solid lubricant layer 25, a layer comprising diamond-like carbon (DLC) composed of carbon added with hydrogen or nitrogen, $SiO_2$ or a UV curing type resin composition, may be exemplified. The diamond-like carbon layer and the $SiO_2$ layer can be formed by a sputtering method, an ion beam sputtering method, a plasma CVD method or the like, and the UV curing type resin is coated into a layer by a spin coating method followed by curing by irradiating ultraviolet rays.

On this layer, further, the liquid lubricant layer 26 is formed by a dipping/lifting method or the like to thereby prepare the optical recording medium.

The dielectric layer may be formed between the reflective layer and the recording layer without causing any trouble.

When the dielectric layer is formed between the reflective layer and the recording layer, it is sufficient that the dielectric layer has a layer thickness to an extent of protecting the recording layer 23, specifically, a layer thickness of from 10 nm to 100 nm is preferred. The recording layer 23 has preferably a layer thickness of from 30 nm to 200 nm. The dielectric layer 24 has roles of controlling the light absorption efficiency to the recording layer 23 and increasing the change of reflection light or the Kerr rotation angle before and after the recording in addition to the role of protecting the recording layer 23. Accordingly, the layer thickness of the dielectric layer 24 should be designed in consideration of the laser wavelength used, and is preferably from 20 nm to 300 nm.

In the present invention, there is no limitation with respect to single surface recording or double surface recording concerning the disk. In the double surface disk, the above-mentioned laminated layers may be formed on a single surface or both surfaces simultaneously.

EXAMPLES

Now, the present invention will be described in detail with reference to Examples. However, the present invention is by no means restricted by such specific Examples.

Examples 1–4 and Comparative Examples 1 and 2

Magneto-optical recording media for near-field optical recording were prepared in a manner as described bellow. Namely, original plates having track pitches and groove depths shown in Table 1 were prepared by using glass substrates on which a positive photo-resist having a thickness of 110 nm was formed and a UV mastering device. Ni stampers were prepared from the original plates. The groove depths were formed by controlling power of light to be exposed in mastering.

Figure 3:
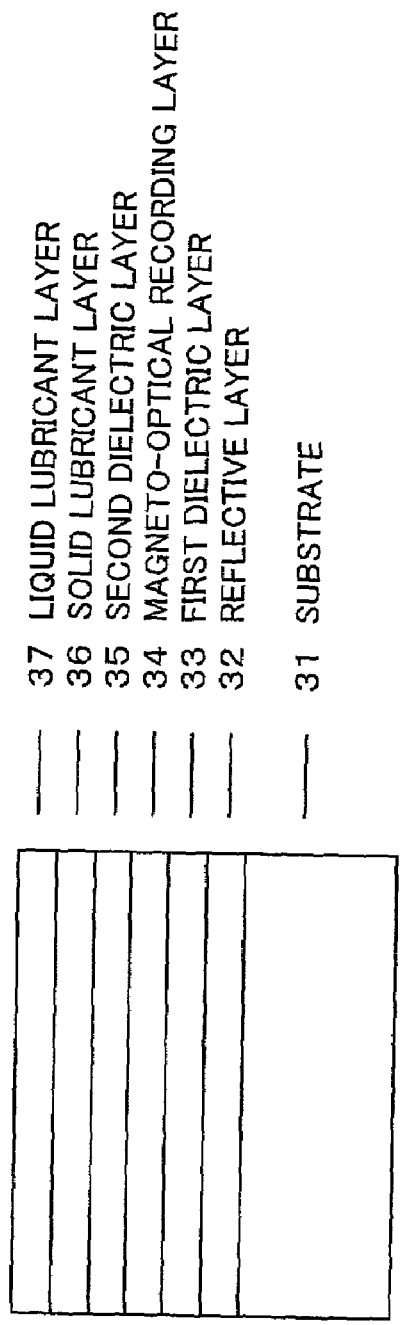
FIG. 3 is a partial cross-sectional view showing diagrammatically an embodiment of the construction of a magneto-optical recording disk of the present invention. The figure shows that a reflective layer 32, a first dielectric layer 33, a magneto-optical recording layer 34, a second dielectric layer 35, a solid lubricant layer 36 and a liquid lubricant layer 37 are formed in this order on a substrate 31.

With these stampers, disk-like substrates of polycarbonate having a diameter of 130 mm were prepared by injection-molding to fabricate optical recording media as shown in FIG. 3. Namely, on an area of the substrates where the land and the groove were formed, an Al alloy layer (layer thickness: 50 nm), a first SiN dielectric layer (10 nm), a magneto-optical recording layer (layer thickness: 20 nm) comprising $Tb_{20}(Fe_{90}Co_{10})_{80}$, a second SiN dielectric layer (layer thickness: 30 nm) and a DLC layer (layer thickness: 20 nm) were successively formed by a sputtering method. Then, as a lubricant layer for the flying head, perfluoropoly-ether was formed in a thickness of 0.5 nm by a dipping method.

Rp was observed by AFM at positions of 30 mm, 45 mm and 60 mm in radius, which were in a recording/reproducing region of the thus obtained optical media, in a range of 9 µm long in a radial direction, which was 20 times as much as the track pitch. As a result, values as shown in Table 1 were obtained at each point of measurement.

TABLE 1

|  | Track pitch (nm) | Groove depth (nm) | Rp (nm) |
| --- | --- | --- | --- |
| Example 1 | 450 | 95 | 43 |
| Example 2 | 450 | 70 | 32 |
| Example 3 | 450 | 40 | 17 |
| Example 4 | 450 | 20 | 8 |
| Comparative Example 1 | 450 | 110 | 51 |
| Comparative Example 2 | 450 | 5 | 2.5 |

The magneto-optical recording media thus obtained were set on a glide tester, and the glide head with a piezo element (manufactured by Glide Right Company: 70% slider, 0.012"×6.0 gr., slider portion: 0.305×2.84 mm) was moved in a range of 27.0–62.0 mm in radius while it was rotated at a linear velocity of 7.5 m/s. The flying height of the glide head was 0.05 µm at the linear velocity of 7.5 m/s.

In the movement of the glide head, the voltage induced in the piezo element was observed by an oscilloscope. In this case, a voltage value exceeding 800 mV was counted in the judgment that there was the contact (hit) to the recording medium.

The above-mentioned measurement was conducted for each 10 magneto-optical recording media of comparative Example 1 and Examples 1–4 to measure the number of hits. Table 2 shows average values of each 10 media as result.

In Comparative Example 1 having a groove depth of 110 nm in which the depth Rp at the center showed 51 nm which exceeded the flying height H, flaws recognizable by naked eyes generated in a string form over the entire circumference of the media, and the counted number of hits was very large.

In Example 1 having a depth Rp at the center of 43 nm which was lower than the flying height H, string-like flaws were short and light in degree, and the number of hits was small, whereby the flying characteristics of the head could be maintained.

In Example 2 in which the depth Rp at the center was 0.64 times as much as the flying height H, Example 3 in which it was 0.34 times and Example 4 in which it was 0.16 times, no flaw was recognized in the media, and excellent flying characteristics were shown.

Further, in Comparative Example 2 in which the depth Rp at the center was 0.05 times of the flying height H too, no flaw was recognized in the media and excellent flying characteristics were shown.

Next, to each 5 magneto-optical recording media of Examples 1–4 and comparative Example 2 for which the flying characteristics were confirmed by the glide tester, the recording/reproducing characteristics were evaluated by a recording/reproducing evaluation device of an optical system of SIL head having a laser wavelength of 680 nm and an effective NA of 1.2.

Table 2 shows average values of 5 media as result.

TABLE 2

|  | Number of hits | Flaw | CNR (dB) |
|---|---|---|---|
| Example 1 | 8 | Slight | 32.0 |
| Example 2 | 3 | Nil | 45.1 |
| Example 3 | 1 | Nil | 47.2 |
| Example 4 | 0 | Nil | 48.5 |
| Comparative Example 1 | 286 | Large |  |
| Comparative Example 2 | 4 | Nil | Inmeasurable |

In Example 1, the carrier-noise ratio (CNR) was low. However, excellent CNR was obtained in Examples 2, 3 and 4. On the other hand, in the disks of Comparative Example 2, the tracking of the SIL head was out, so that the measurement of the recording/reproducing characteristics was impossible.

Example 5

A circular substrate of polycarbonate having a diameter of 130 mm with a guide groove having a track pitch of 0.43 μm was formed by injection-molding to prepare an optical recording medium as shown in FIG. 2. Namely, on the substrate, an AlCr alloy having a layer thickness of 50 nm was formed as a reflective layer by DC sputtering method. Further, as a recording layer, TbFeCo having a layer thickness of 20 nm was formed by DC sputtering method. On this, as a dielectric layer, SiN having a layer thickness of 50 nm was formed by a reactive DC sputtering method using a Si target in an atmosphere of a mixture of Ar and $N_2$. On this, further, as a solid lubricant layer, diamond-like carbon (DLC) having a layer thickness of 20 nm was formed by a reactive RF sputtering method using a C target in an atmosphere of a mixture of Ar and $CH_4$ to prepare a near-field magneto-optical recording medium.

Example 6

A near-field magneto-optical recording medium was prepared by the same method as in Example 5 except that the layer thickness of SiN was 200 nm and the partial pressure of $N_2$ was 1.2 Pa in laminating the SiN dielectric layer on the recording layer.

Example 7

A near-field magneto-optical recording medium was prepared by the same method as in Example 5 except that as a liquid lubricating layer, a perfluoropolyether type lubricant ("Fomblin ZDOL2000" (tradename) manufactured by Ausimont Company) was formed in a thickness of 0.5 nm on the solid lubricant layer.

Example 8

A near-field magneto-optical recording medium was prepared by the same method as in Example 5 except that in laminating the SiN dielectric layer on the recording layer, the layer thickness of SiN was 200 nm and the partial pressure of $N_2$ was 1.2 Pa, and as a liquid lubricant layer, a perfluoropolyether type lubricant ("Fomblin ZDOL2000" (tradename) manufactured by Ausimont Company) was formed in a thickness of 3.0 nm on the solid lubricant layer.

Comparative Example 3

A near-field magneto-optical recording medium was prepared by the same method as in Example 5 except that in laminating the SiN dielectric layer on the recording layer, the layer thickness of SiN was 30 nm and the partial pressure of $N_2$ was 0.4 Pa.

Comparative Example 4

A near-field magneto-optical recording medium was prepared by the same method as in Example 5 except that in laminating the SiN dielectric layer on the recording layer, the layer thickness of SiN was 250 nm and the partial pressure of nitrogen gas was 1.4 Pa.

On the near-field magneto-optical recording media in Examples 5–8 and Comparative Examples 3–4, the following evaluation was conducted. Before the liquid lubricant was laminated on the solid lubricant layer, the surface roughness Ra on the centerline of the land portion and the groove portion at 3 points of 30, 40 and 50 mm of radial position of the recording media was measured by an atomic force microscope (manufactured by Seiko Electronics), and the Ra values of the recording media were determined based on average values of 3 points of radial position of each of the land portion and the groove portion. With respect to the recording media on which the liquid lubricant was laminated, the layer thickness of the liquid lubricant was calculated based on C1s spectrum at 3 points of 30, 40 and 50 mm of radial position by ESCA (manufactured by Perkin-Elmer Company), and the layer thickness of the recording media was determined by each average value of 3 points of radial position. Further, each recording medium was rotated at 2400 per minute to fly by dynamic loading a flying SIL head with a slider having a laser wavelength of 680 nm and an effective numerical aperture of 1.2 on its thin layer in a height of 100 nm above the recording medium. Recording was conducted by irradiating pulsating laser while the recording layer was heated to the Curie temperature or more and a magnetic field by the coil in the SIL head was modulated with 10 MHz. SNR recorded with 10 MHz was measured at 3 points of 30, 40 and 50 mm of radial position and SNR of the recording medium was determined based on the average value.

The SNR value was obtained by measuring under the condition that SNR became the maximum by adjusting the power for reproducing on each medium. Successively, long-time seek tests were conducted with the flying SIL having a slider. Each recording medium was set on the spindle of a drive and it was rotated at 2400 per minute. The SIL head was dynamic-loaded to fly it in a flying height of 100 nm above the recording medium and continuous seek was conducted for 2 hours at 7 Hz over a range of 30–50 mm in radius. After the seek tests were finished, the SIL head was unloaded and the surface of the slider of the head and the surface of the lens were observed. In the observation, an optical microscope was used. A result of evaluation is summarized in Table 3.

TABLE 3

| | Centerline mean roughness Ra (nm) | | Layer thickness of liquid lubricant (mm) | SNR (dB) | Result of observation of SIL head |
|---|---|---|---|---|---|
| | Land portion | Groove portion | | | |
| Example 1 | 0.32 | 0.36 | — | 25.1 | No deposition of foreign matter |
| Example 2 | 1.85 | 1.90 | — | 24.6 | No deposition of foreign matter |
| Example 3 | 0.32 | 0.36 | 0.54 | 25.4 | No deposition of foreign matter |
| Example 4 | 0.85 | 1.90 | 3.02 | 25.0 | No deposition of foreign matter |
| Comparative Example 1 | 0.10 | 0.13 | — | 25.3 | Flake-like foreign matter on the surface of slider and lens |
| Comparative Example 2 | 2.37 | 2.44 | — | 19.7 | No deposition of foreign matter |

In Examples 5 and 6, the centerline mean roughness Ra of each recording medium was in a range of 0.2 nm≦Ra≦2.0 nm, and in Examples 7 and 8, the centerline mean roughness Ra of each recording medium was in a range of 0.2 nm≦Ra≦2.0 nm. Thus, the layer thickness t of the liquid lubricant satisfied t≦2 Ra. SNR, in this case, respectively exceeded 24 dB to show a sufficient SNR. In the observation of the SIL head after the seek tests, there was no deposition of foreign matter or the liquid lubricant on either the slider portion or the lens portion, and it was found that the SIL head flied stably in the seek tests.

In Comparative Example 3, since Ra was small as 0.1 nm, SNR showed a sufficiently high value as 25 dB. However, there was found that a large number of flake-like foreign matters deposited on the slider portion and the lens portion of the SIL head in the seek tests, and the SIL head had frequently contacted the recording medium during the flying.

In Comparative Example 4, SNR is only about 20 dB. The reason is that Ra is too large because the noise level is high. In the seek tests, there is no deposition of foreign matter or the liquid lubricant on either the slider portion or the lens portion, and it is found that the SIL head flies stably in the seeking tests.

Example 9 and Comparative Example 5

On each disk-like substrate of polycarbonate having a diameter of 130 mm in which a helical guide groove having a track pitch of 0.45 μm and a depth of 85 nm was formed, a reflective layer of $Al_{0.97}Cr_{0.03}$ having a layer thickness of 50 nm was formed by a DC sputtering method; a magneto-optical recording layer of $Tb_{20}(Fe_{90}Co_{10})_{80}$ having a layer thickness of 20 nm was formed by the DC sputtering method on this; a dielectric layer of SiN having a layer thickness of 30 nm was formed by a reactive RF sputtering method on this layer, and a solid lubricant layer of diamond-like carbon having a layer thickness of 20 nm was formed by the reactive RF sputtering method on this layer.

After the formation of the solid lubricant layer, the depth of the groove was measured by an atomic force microscope (AFM) to find 94 nm.

Then, the media were immersed in a solution of perfluoropolyether ("Fomblin ZDOL-2000" (tradename) manufactured by Ausimont Company), which had a weight average molecular weight of 2400 and which had hydroxyl groups at both terminals of the molecule, dissolved in a perfluoropolyether type solvent ("GALDEN SV-70" (tradename) manufactured by Ausimont Company). By lifting up the media, a liquid lubricant layer was formed on each of the media. Thus, magneto-optical recording media were manufactured.

In the preparation of the magneto-optical recording media, the layer thickness of the lubricant was changed to 0.5, 1.0 and 1.5 nm in Example, and the layer thickness of the lubricant layer was changed to 0.2 and 2.5 nm in Comparative Example 5 by changing the concentration of the solvent. The layer thickness of the lubricant layers was measured by an X-ray photo-electron spectral analyzing system (XPS).

Surface analysis was conducted on —$CF_2CH_2OH$ fragment ions (81 amu) in a state of dispersion of the lubricant on the surface of each medium by using TOF-SIMS. In the measurement of an agglomerated state of the lubricant, it was found that the diameter was 0.3 μm.

The magneto-optical recording media thus obtained were set on a glide tester, and the glide head with a piezo element (manufactured by Glide Right Company: 70% slider, 0.012"×6.0 gr, slider portion: 0.305×2.84 mm) was moved in a range of 30–60 mm in radius while it was rotated at a linear velocity of 7.5 m/s to evaluate the glide characteristics. The flying height of the glide head was 0.05 μm at the linear velocity of 7.5 m/s. In the seeking of the glide head, a voltage induced in the piezo element was observed by an oscilloscope. The case that a voltage value exceeds 800 mV was judged as the contact of the head to the medium, and the number of times of contact was recorded.

Measurement was conducted for each 10 media. As a result, in the magneto-optical recording media having a lubricant layer thickness of 0.5, 1.0 and 1.5 nm in Example 9, the number of times of contact was within 2 times, and the proportion of the media having zero contact was excellent as 60% or more. In the magneto-optical medium having a lubricant layer thickness of 0.2 nm in Comparative Example 5, the number of times of contact was about 5 in average.

Then, the magneto-optical recording media having a lubricant layer thickness of 1.0, 1.5 and 2.5 nm were set on a recording/reproducing evaluation device of an optical system of a near-field recording head having a laser wavelength of 680 nm and an effective NA of 1.2, and evaluation was conducted on the recording/reproducing characteristics. Recording was conducted to the media by rotating the media at a linear velocity of 7.0 m/s, irradiating laser adjusted so that the power was 6.0 mW in front of the objective lens, and applying a magnetic field modulated to be ±150 Oe at a frequency of 7.0 MHz from the coil of SIL head. Then, reproducing was conducted by irradiating laser adjusted so that the power was 1.0 mW in front of the objective lens.

In any of the media having the lubricant layer thickness of 1.0, 1.5 and 2.5 nm, CNR was 48 dB. However, when the above-mentioned recording and reproducing were repeated 10 times on the same track, no change of CNR was recognized in the media having the lubricant layer thickness of 1.0 nm and 1.5 nm in Example 9, but in the medium having the lubricant layer thickness of 2.5 nm in Comparative Example 5, CNR decreased to 35 dB. The cause was examined to find that the surface of the lens of SIL head was stained in a dark color.

Example 10 and Comparative Example 6

Magneto-optical recording media were prepared by the same method as in Example 9 except that substrates of polycarbonate in which a helical guide groove having a track pitch of 0.35 μm and a depth of 120 nm was formed were used.

The depth of the groove after the formation of the solid lubricant layer was measured to find 142 nm.

The magneto-optical recording media were prepared by changing the layer thickness of the lubricant layer to 1.0 and 1.5 nm in Example 10 by changing the concentration of the solvent in coating the lubricant layer, and in Comparative Example 6, the layer thickness of the lubricant layer was 2.5 nm.

The diameter of the lubricant in an agglomerated state measured by TOF-SIMS was 0.25 μm.

Evaluation was made on the glide characteristics of the thus obtained magneto-optical recording media by the same method as in Example 9.

As a result of conducting the measurement for each 10 media, the number of times of contact was within 3 times, and the proportion of media having zero contact was excellent as 50%.

Then, evaluation was made on the recording/reproducing characteristics of the media by the same method as in Example 9.

CNR was 44 dB in all media. When the above-mentioned recording/reproducing were repeated 10 times on the same track, no change of CNR was recognized in the media having the lubricant layer thickness of 1.0 nm and 1.5 nm in Example 10, but in the medium having the layer thickness of 2.5 nm in Comparative Example 6, CNR decreased to 30 dB. The cause was examined to find that the surface of the lens of the optical lens was stained.

Example 11

Magneto-optical recording media were prepared by the same method as in Example 9 except that substrates of polycarbonate in which a helical guide groove having a track pitch of 0.45 μm and a depth of 150 nm was formed were used.

The depth of the groove after the formation of the solid lubricant layer was measured to find 164 nm. In this case, the layer thickness of the lubricant layer was changed to 0.5, 1.0 and 1.5 by changing the concentration of the solvent.

The diameter of the lubricant in an agglomerated state of the thus prepared magneto-optical recording media measured by TOF-SIMS was 0.2 μm.

Evaluation was made on the glide characteristics of the thus obtained magneto-optical recording media by the same method as in Example 9.

Measurement was conducted for each 10 media. As a result, the number of times of contact slightly increased in comparison with Examples 9 and 10. However, the number was within 5 times in all media, and the proportion of the media of zero contact was 15%.

Comparative Example 7

Magneto-optical recording media were prepared by the same method as in Example 9 except that substrates of polycarbonate having no guide groove were used.

In this case, the layer thickness of the lubricant layer was changed to 0.5, 1.0, 1.5 and 2.5 nm by changing the concentration of the solvent.

In the measurement of the agglomerated state of the lubricant on the media having no guide groove by TOF-SIMS, the state of dispersion changed depending on the layer thickness of the lubricant: 15 μm in the layer thickness of 0.5 nm; 18 μm in the layer thickness of 1.0 nm; 25 μm in the layer thickness of 1.5 nm and 37 μm in the layer thickness of 2.5 nm.

The optical head was floated above the thus obtained magneto-optical recording media for a time corresponding to 10 times of the number of times of recording/reproducing. The state of the surface of the optical head was observed. As a result, a stain deposited on the surface of the lens of the optical head for all the disks.

Example 12

On each disk-like substrate of polycarbonate having a diameter of 130 mm in which a guide groove having a track pitch of 0.45 μm was formed, a reflective layer of $Al_{0.97}Cr_{0.03}$ having a layer thickness of 50 nm was formed by a DC sputtering method; a magneto-optical recording layer of $Tb_{20}(Fe_{90}Co_{10})_{80}$ having a layer thickness of 20 nm was formed by the DC sputtering method on the reflective layer; a dielectric layer of SiN having a layer thickness of 30 nm was formed by a reactive RF sputtering method on the recording layer, and further, a solid lubricant layer of diamond-like carbon having a layer thickness of 20 nm was formed by the reactive RF sputtering method on the dielectric layer.

Then, these media were immersed for 1 minute in a solution (0.1 vol. %) of perfluoropolyether ("Fomblin Z DEAL" (tradename) manufactured by Ausimont Company), which had a weight average molecular weight of 2000 and which had ester groups at both terminals of the molecule, dissolved in a perfluoropolyether type solvent ("GALDEN SV-70" (tradename) manufactured by Ausimont Company). Then, the media were lifted up and they were again immersed in the perfluoropolyether type solvent ("GALDEN SV-70" (tradename) manufactured by Ausimont Company) for 1 minute. By lifting up the magneto-optical recording media again, a lubricant layer having a layer thickness of 2 nm was formed. Thus, the magneto-optical recording media were prepared. The thus prepared magneto-optical recording media were immersed in the perfluoropolyether type solvent ("GALDEN SV-70" (tradename) manufactured by Ausimont Company) for 1 minute and the media were lifted up. In the measurement of the layer thickness of the lubricant layer, the layer thickness was 1.4 nm and the ratio of the remaining layer was 70%.

Then, the prepared magneto-optical recording media were set on a glide tester, and the glide head with a piezo element (manufactured by Glide Right Company: 70% slider, 0.012"×6.0 gr) was moved for seeking in a range of 30–60 mm in radius while the media were rotated at a linear velocity of 7.5 m/s to evaluate the glide characteristics. The flying height of the glide head was 0.05 μm at the linear velocity of 7.5 m/s.

A voltage induced in the piezo element in the seeking by the glide head was observed by an oscilloscope. The time at which a voltage value exceeded 800 mV was judged as the head contacted the media, and the number of times of contact was recorded.

Measurement was conducted on 10 magneto-optical recording media in total prepared by the above-mentioned method. As a result, the number of times of contact was within 5 in respective media, and the proportion of the media of zero contact was excellent as 70% or more.

Then, these media were set on a recording/reproducing evaluation device of an optical system of SIL having a laser wavelength of 680 nm and an effective NA of 1.2 to evaluate the recording/reproducing characteristics. Recording was conducted to the media by rotating each medium at a linear velocity of 7.0 m/s and irradiating laser adjusted so that the power was 6.0 mW in front of the objective lens while a magnetic field modulated to be a magnitude of ±150 Oe at a frequency of 7.0 MHz was applied from the coil of SIL head. Next, reproducing was conducted by irradiating laser adjusted so that the power was 1.0 mW in front of the objective lens.

CNR was 43 dB, and no change of CNR was recognized in a case that similar recording and reproducing were repeated 10 times on the same track.

Example 13

Layers were laminated up to the solid lubricant layer by the same method as in Example 12. Then, magneto-optical recording media were immersed for 1 minute in a solution (0.1 vol. %) of perfluoropolyether ("DEMNUM SP" (tradename) manufactured by Daikin Company), which had a weight average molecular weight of 3200 and which had an ester group at one terminal of the molecule, dissolved in a perfluoropolyether type solvent ("GALDEN SV-70" (tradename) manufactured by Ausimont Company). The media were lifted up and they were again immersed for 1 minute in the perfluoropolyether type solvent ("GALDEN SV-70" (tradename) manufactured by Ausimont Company). By lifting up the media, a lubricant layer having a layer thickness of 2 nm was formed. Thus, magneto-optical recording media were prepared.

The thus obtained media were immersed in the perfluoropolyether type solvent ("GALDEN SV-70" (tradename) manufactured by Ausimont Company) for 1 minute. After the media were lifted up, the layer thickness of the lubricant layer was measured. The layer thickness was 1.6 nm and the proportion of the remaining layer thickness was 80%.

Then, evaluation was made as to the glide characteristics of the thus obtained magneto-optical recording media by the same method as in Example 12.

Measurement was conducted to 10 magneto-optical recording media prepared by the same method as described above. As a result, the number of times of contact was within 3 in all the media, and the proportion of the media of zero contact was excellent as 80%.

Subsequently, on the recording/reproducing characteristics of the magneto-optical recording media, evaluation was made by the same method as in Example 12.

CNR was 43 dB, and no change of CNR was recognized even in a case that the same recording and reproducing were repeated 10 times on the same track.

Comparative Example 8

Layers were laminated up to the solid lubricant layer by the same method as in Example 12 to prepare magneto-optical recording media without forming any lubricant layer thereafter.

Evaluation was made by the same method as in Example 12 on the glide characteristics of the thus obtained magneto-optical recording media. Noises generated in the seeking, and thin flaws were partly produced in the surface of the disks after the seeking.

Comparative Example 9

Layers were laminated up to the solid lubricant layer by the same method as in Example 12. Then, the media were immersed for 1 minute in a solution (0.06 vol. %) of perfluoropolyether ("Fomblin Z DEAL" (tradename) manufactured by Ausimont Company), which had a weight average molecular weight of 2000 and which had ester groups at both terminals of the molecule, dissolved in a perfluoropolyether type solvent ("GALDEN SV-70" (tradename) manufactured by Ausimont Company). By lifting up the media, a lubricant layer of a layer thickness of 2 nm was formed. Thus, magneto-optical recording media were prepared.

The thus obtained media were immersed in the perfluoropolyether type solvent ("GALDEN SV-70" (tradename) manufactured by Ausimont Company) for 1 minute. After the media were lifted up, the layer thickness of the lubricant layer was measured. The layer thickness was 0.8 nm, and the proportion of the remaining layer thickness was 40%.

Evaluation was made by the same method as in Example 12 on the glide characteristics of the magneto-optical recording media.

Measurement was conducted on 10 magneto-optical recording media. As a result, the number of times of contact was within 4 in all media, and the proportion of the media of zero contact was excellent as 70%.

Subsequently, on the recording/reproducing characteristics of the magneto-optical recording media, evaluation was made by the same method as in Example 12.

CNR was 43 dB. However, when similar recording/reproducing were repeated 10 times on the same track, CNR decreased to 38 dB. The cause was examined to find that the lubricant deposited on the lens surface of SIL head turned to a dark color.

Comparative Example 10

Layers are laminated up to the solid lubricant layer by the same method as in Example 12. Then, the media were immersed for 1 minute in a solvent (0.06 vol. %) of perfluoropolyether ("Fomblin AM2001" (tradename) manufactured by Ausimont Company), which had a weight average molecular weight of 2400 and which had piperonyl groups at both terminals of the molecule, dissolved in a perfluoropolyether type solvent ("GALDEN SV-70" (tradename) manufactured by Ausimont Company). By lifting up the media, a lubricant layer of a layer thickness of 2 nm was formed. Thus, magneto-optical recording media were prepared.

The thus obtained media were immersed in a perfluoropolyether type solvent ("GALDEN SV-70" (tradename) manufactured by Ausimont Company) for 1 minute. The media were lifted up and the layer thickness of the lubricant layer was measured. The layer thickness was 1.0 nm, and the proportion of the remaining layer thickness was 50%.

Then, evaluation was made by the same method as in Example 12 on the magneto-optical recording media.

Measurement was conducted on 10 magneto-optical recording media. As a result, the number of times of contact was within 10 times in all media, and the proportion of the media of zero contact was excellent as 60%.

Subsequently, evaluation was made on the recording/reproducing characteristics of the magneto-optical recording media by the same method as in Example 12.

CNR was 43 dB. However, when the similar recording and reproducing were repeated 10 times on the same track, CNR decreased to 35 dB. The cause was examined to find that the lubricant adhered on the lens surface of SIL head turned to a dark color.

Example 14

On each disk-like substrate of polycarbonate having a diameter of 130 mm in which a guide groove having a track pitch of 0.45 μm was formed, a reflective layer of $Al_{0.97}Cr_{0.03}$ having a layer thickness of 50 nm was formed by a DC sputtering method. On this, a magneto-optical recording layer of $Tb_{20}(Fe_{90}Co_{10})_{80}$ having a layer thickness of 20 nm was formed by the DC sputtering method. On this, a dielectric layer of SiN having a layer thickness of 30 nm was formed by a reactive RF sputtering method. On this, further, a solid lubricant layer of diamond-like carbon having a layer thickness of 20 nm was formed by the reactive RF sputtering method.

Then, the media were immersed for 1 minute in a solution (0.01 vol. %) of perfluoropolyether ("Fomblin ZDOL4000" (tradename) manufactured by Ausimont Company), which had a weight average molecular weight of 4000 and which had —$CH_2OH$ at both terminals of the molecule, dissolved in a perfluoropolyether type solvent ("GALDEN SV-70" (tradename) manufactured by Ausimont Company). By lifting up the media, 10 magneto-optical recording media on which a lubricant layer having a layer thickness of 1 nm was formed, were prepared.

In the measurement of the contact angle of water to the surface of the thus obtained magneto-optical recording media, the contact angle was 80°.

Then, these media were put in an environmental tester and left for 1000 hours under environmental conditions of 80° C. and 85% RH. In the observation of 10 media taken, no abnormality was recognized on the layer plane in all media.

Example 15

10 Magneto-optical recording media were prepared by laminating layers up to the solid lubricant layer by the same method as in Example 14, and then, forming a lubricant layer having a layer thickness of 5 μm by spin-coating a fluorine type polymer solution ("Cytop CTX809A" (tradename) manufactured by Asahi Glass Company, Limited) on the media.

In the measurement of the contact angle of water to the surface of the thus obtained media, the contact angle was 120°.

Then, these media were put in an environmental tester and left for 1000 hours under environmental conditions of 80° C. and 85% RH. In the observation of 10 media taken, no abnormality was recognized on the layer plane in all media.

Comparative Example 11

10 Magneto-optical recording media were prepared by laminating layers up to the solid lubricant layer by the same method as in Example 14. The contact angle of water to the surface of the recording media was measured. The contact angle was 50°.

Then, these media were put in an environmental tester and left for 1000 hours under environmental conditions of 80° C. and 85% RH. In the observation of 10 media taken, a corroded portion was recognized in the layer plane of all media.

Comparative Example 12

10 Magneto-optical recording media were prepared by laminating layers up to the solid lubricant layer by the same method as in Example 14; immersing for 1 minute the media in a solution (0.004 vol. %) of perfluoropolyether ("Fomblin ZDOL4000" (tradename) manufactured by Ausimont Company), which had a weight average molecular weight of 4000 and which had —$CH_2OH$ at both terminals of the molecule, dissolved in a perfluoropolyether type solvent ("GALDEN SV-70" (tradename) manufactured by Ausimont Company), and lifting up the media to form a lubricant layer having a layer thickness of 0.3 nm.

The contact angle of water to the surface of the thus obtained magneto-optical recording media was measured. The contact angle was 65°.

Then, the media were put in an environmental tester and left for 1000 hours under environmental conditions of 80° C. and 85% RH. In the observation of 10 media taken, a corroded portion was recognized on the layer plane in 8 media.

Example 16

On disk-like substrates of polycarbonate having a diameter of 130 mm in which a guide groove having a track pitch of 0.45 μm was formed, a reflective layer of $Al_{0.97}Cr_{0.03}$ having a layer thickness of 50 nm was formed by a DC sputtering method. On this, a recording layer of $Tb_{20}(Fe_{90}Co_{10})_{80}$ having a layer thickness of 20 nm was formed by the DC sputtering method. On this, a dielectric layer of SiN having a layer thickness of 30 nm was formed by a reactive RF sputtering method.

Then, by spin-coating a fluorine-type polymer solution ("Cytop CTX809A" (tradename) manufactured by Asahi Glass Company, Limited) on the media, 10 magneto-optical recording media with a lubricant layer having a layer thickness of 5 μm were prepared.

The thus obtained magneto-optical recording media were set on a glide tester, and the glide head with a piezo element (manufactured by Glide Right Co.: 70% slider, 0.012"×6.0 gr) was moved for seeking in a range of 30–60 mm in radius while the media were rotated at a linear velocity of 7.5 m/s to evaluate the glide characteristics. The flying height of the glide head was 0.05 μm at the linear velocity of 7.5 m/s. The voltage induced in the piezo element in the seeking by the glide head was observed by an oscilloscope. The time at which a voltage value exceeded 800 mV was judged as the head contacted the media, and the number of times was recorded.

Measurement was conducted on 10 magneto-optical recording media. As a result, the number of times of contact was excellent as within 30 times in respective media.

Then, these media were set on a recording/reproducing evaluation device of an optical system of SIL having a laser wavelength of 680 nm and an effective NA of 1.2 to evaluate the recording/reproducing characteristics. Recording was conducted to the media by rotating each medium at a linear velocity of 7.0 m/s and irradiating laser adjusted so that the power was 6.0 mW in front of the objective lens while a magnetic field modulated to be a magnitude of ±150 Oe at a frequency of 7.0 MHz was applied from the coil of SIL head. Then, reproducing was conducted by irradiating laser adjusted so that the power was 1.0 mW in front of the objective lens.

CNR was 42 dB, and no change of CNR was recognized even in a case that similar recording and reproducing were repeated 10 times on the same track.

Example 17

Layers were laminated up to the dielectric layer by the same method as in Example 16. Then, media were immersed for 1 minute in a solution (0.1 vol. %) of a fluorine type polymer ("Teflon AF1600" (tradename) manufactured by Du Pont), dissolved in a fluorine type solvent ("Fluorinert FC-75" (tradename) manufactured by Sumitomo 3M). By lifting up the media, magneto-optical recording media with a lubricant layer having a layer thickness of 10 nm were prepared.

The glide characteristics of the thus obtained magneto-optical recording media were evaluated by the same method as in Example 16. The number of times of contact was excellent as within 20.

Then, the recording/reproducing characteristics of these media were evaluated by the same method as in Example 16.

CNR was 43 dB, and no change of CNR was recognized even in a case that the same recording and reproducing were repeated 10 times on the same track.

Comparative Example 13

Layers were laminated up to the dielectric layer by the same method as in Example 16. Then, magneto-optical recording media were produced without forming a lubricant layer.

The glide characteristics of the thus obtained magneto-optical recording media were evaluated by the same method as in Example 16. At the time of initiating seeking, the head contacted severely the media to generate noises. Accordingly, it was impossible to evaluate on the entire surface.

Comparative Example 14

Layers were laminated up to the dielectric layer by the same method as in Example 16. Then, an acrylic type overcoating agent ("Daicure Clear SD-318" (tradename) manufactured by DAINIPPON INK AND CHEMICALS, INC.) was spin-coated on the media followed by irradiating UV to form a lubricant layer having a layer thickness of 5 µm. Thus, magneto-optical recording media were prepared.

The glide characteristics of the thus obtained magneto-optical recording media were evaluated by the same method as in Example 16. The number of times of contact was within 50 in all media.

Then, evaluation was made on the recording/reproducing characteristics of these media by the same method as in Example 16. Although CNR was 42 dB, CNR decreased to 20 dB when the same recording/reproducing were repeated 10 times on the same track. The cause was examined to find that the color in the medium surfaces in the portion to which recording/reproducing were conducted, changed.

Example 18

On disk-like substrates of polycarbonate having a diameter of 130 mm in which a guide groove having a track pitch of 0.45 µm was formed, a reflective layer of $Al_{0.97}Cr_{0.03}$ having a layer thickness of 50 nm was formed by a DC sputtering method. On this, a recording layer of $Tb_{20}(Fe_{90}Co_{10})_{80}$ having a layer thickness of 20 nm was formed by the DC sputtering method. On this, a dielectric layer of SiN having a layer thickness of 30 nm was formed by a reactive RF sputtering method.

Then, 10 magneto-optical recording media with a lubricant layer having a layer thickness of 1 µm were prepared by spin-coating on these media a fluorine-type polymer solution ("Cytop CTX809A" (tradename) manufactured by Asahi Glass Company, Limited) added with 0.1 vol. % of perfluoropolyether ("Fomblin Z DEAL" (tradename) manufactured by Ausimont Company) which had a weight average molecular weight of 2000 and which had ester groups at both terminals of the molecule.

The transmittance of light of the lubricant layer in a case that the lubricant layer having a layer thickness of 1 µm was formed on a substrate of quartz was 95% or more in a range of a wavelength from 300 to 1000 nm.

The glide characteristics of the thus obtained magneto-optical recording media were evaluated by the same method as in Example 16. The flying height of the glide head was 0.05 µm at a linear velocity of 7.5 m/s.

As a result of measuring the 10 magneto-optical recording media, the number of times of contact was within 5 in all media, and the proportion of the media in terms of the number of times of contact was excellent as 80% or more.

Then, the recording/reproducing characteristics of these media were evaluated in the same manner as in Example 16. CNR was 43 dB, and no change of CNR was recognized even in a case that the same recording/reproducing were repeated 10 times on the same track.

Example 19

Layers were laminated up to the dielectric layer by the same method as in Example 18. Then, media was immersed for 1 minute in a solution obtained by dissolving 0.1 vol. % of a fluorine type polymer solution ("Teflon AF1600" (tradename) manufactured by Du Pont) added with 0.01 vol. % of perfluoropolyether (Fomblin Z "DOL" (tradename) manufactured by Ausimont Company) which had an weight average molecular weight of 2000 and which had alcohol groups at both terminals of the molecule, by a fluorine type solvent ("Fluorinert FC-75" (tradename) manufactured by Sumitomo 3M). By lifting up the media, magneto-optical media with a lubricant layer having a layer thickness of 10 nm were prepared.

The glide characteristics of the thus obtained magneto-optical recording media were evaluated by the same method as in Example 16. As a result of conducting the measurement to 10 magneto-optical media, the number of times of contact was within 6 in all media, and the proportion of media having 0-contact was excellent as 70%.

Then, the recording/reproducing characteristics of these media were evaluated by the same method as in Example 16. CNR was 43 dB, and no change of CNR was recognized even in a case that the same recording/reproducing were repeated 10 times on the same track.

Example 20 circular substrates of polycarbonate having a diameter of 130 mm which had spiral land/groove portions having a track pitch of 0.43 µm and a header portion in both front and rear surfaces were prepared by injection-molding. By a stamper used in this case, the depth of the groove in each substrate in a region of 20–60 mm in radius excluding the header portion was 90 nm and concave pits having a depth of 90 nm were arranged in the header portion.

On both front and rear surfaces of the substrates, a reflective layer, a recording layer, a dielectric layer and a solid lubricant layer were laminated in this order. As the reflective layer, AlCr alloy having a layer thickness of 50 nm was laminated by a DC sputtering method. Further, as the recording layer, TbFeCo having a layer thickness of 20 nm was laminated by the DC sputtering method. On this, as the dielectric layer, SiN having a layer thickness of 50 nm was laminated by a reactive DC sputtering method using a Si target in an atmosphere of a mixture of Ar and $N_2$. On this, further, diamond-like carbon (DLC) having a layer thickness of 20 nm was laminated as the solid lubricant layer by the reactive RF sputtering method using a C target in an atmosphere of a mixture of Ar and $CH_4$. Thus, double-side recordable magneto-optical recording media were prepared.

Example 21

Circular substrates of polycarbonate having a diameter of 130 mm which had spiral land/groove portions having a track pitch of 0.43 μm and a header area in both front and rear surfaces were prepared by injection-molding. By a stamper used in this case, the depth of the groove in each substrate in a region of 20–60 mm in radius excluding the header was 90 nm, and an arc-like groove having a depth of 90 nm was formed in the header area.

In both front and rear surfaces of the substrates, a reflective layer, a recording layer, a dielectric layer and a solid lubricant layer were laminated in this order. As the reflective layer, AlCr alloy having a layer thickness of 50 nm was laminated by a DC sputtering method. As the recording layer, TbFeCo having a layer thickness of 20 nm was laminated by the DC sputtering method. On this, as the dielectric layer, SiN having a layer thickness of 50 nm was laminated by a reactive DC sputtering method using a Si target in an atmosphere of a mixture of Ar and $N_2$. Further on this, diamond-like carbon (DLC) having a layer thickness of 20 nm was laminated as the solid lubricant layer by the reactive RF sputtering method using a C target in an atmosphere of a mixture of Ar and $CH_4$. Thus, magneto-optical recording media capable of recording/reproducing at both surfaces were prepared.

Comparative Example 15

Magneto-optical recording media capable of recording/reproducing in both surfaces were prepared by the same method as in Example 20 except that the height of the header area was equal to the land in both front and rear surfaces of the substrates, and the header area had no pit and groove.

The following evaluation was conducted on one surface of near-field magneto-optical recording media prepared by the method described in Examples 20 and 21 and Comparative Example 15. First, the shape of the surface in the header area and the land/groove portions in a range of 21.5 μm in radial direction, which corresponded to 50 times of the track pitch, at 5 positions of 20, 30, 40, 50 and 60 mm in radius of the recording media was measured by a scanning electronic microscope. Based on a result of the measured shape, the depth Rp from the maximum height to the centerline was calculated.

Subsequently, the flying height characteristics of the recording media were evaluated. First, the recording media were set on the spindle of a glide tester (manufactured by Hitachi Electronics Engineering, Ltd.). Then, the recording media was each rotated at a linear velocity of 7 m/sec so that the flying height of the glide head (manufactured by Glide Right Co.) with a piezo element (70% slider, 6.0 gr) from the recording media was 50 nm constantly. The effective voltage values of signal outputted from the piezo element at 5 radial positions of 20, 30, 40, 50 and 60 mm of each recording medium were measured. Then, SNR was measured. The recording medium was rotated 2400 per minute, and a flying type optical head (λ/16 NA: 35.4 nm, λ/20 NA: 28.3 nm) with a slider having a laser wavelength of 680 nm and an effective numerical aperture of 1.2 was floated at a height of 50 nm above the thin layer surface of the recording medium by a dynamic load. Recording was conducted while the recording layer was heated to the Curie temperature or more by irradiating pulsed laser and the magnetic field of the coil on the SIL head was modulated with 10 MHz. During the recording with 10 MHz, SNR was measured at 5 radial positions of 20, 30, 40, 50 and 60 mm of the recording medium. The values of SNR are obtained by measuring under such conditions that SNR becomes the maximum by adjusting power in reproducing. A result of evaluation to each medium is summarized in Table 4.

TABLE 4

| | | Rp (nm) | | | Effective voltage value | SNR |
|---|---|---|---|---|---|---|
| | Radius (mm) | Header area (Rph) | Land/groove portion (Rpd) | Difference | (mV) | (dB) |
| Example 20 | 20 | 18.2 | 37.6 | 19.4 | 153 | 25.1 |
| | 30 | 16.5 | 38.3 | 21.8 | 148 | 25.8 |
| | 40 | 17.3 | 37.7 | 20.4 | 138 | 25.8 |
| | 50 | 19.1 | 39.8 | 20.7 | 145 | 25.4 |
| | 60 | 19.3 | 39.9 | 20.6 | 150 | 25.3 |
| | ΔRp | | | 23.4 | | |
| Example 21 | 20 | 26.8 | 38.2 | 11.4 | 132 | 26.3 |
| | 30 | 25.9 | 37.4 | 11.5 | 121 | 26.6 |
| | 40 | 27.1 | 38.0 | 10.9 | 114 | 26.5 |
| | 50 | 26.5 | 37.6 | 11.1 | 116 | 26.2 |
| | 60 | 27.8 | 39.7 | 11.9 | 125 | 25.8 |
| | ΔRp | | | 13.8 | | |
| Comparative Example 15 | 20 | 1.8 | 38.7 | 36.9 | 379 | 18.7 |
| | 30 | 2.1 | 38.2 | 36.1 | 351 | 19.0 |
| | 40 | 1.6 | 39.5 | 37.9 | 362 | 18.9 |
| | 50 | 1.1 | 37.1 | 36.0 | 344 | 18.4 |
| | 60 | 1.9 | 40.3 | 38.4 | 386 | 17.9 |
| | ΔRp | | | 39.2 | | |

In Examples 20 and 21, the difference of Rp of the header area and the land/groove portions at the same radial positions is small, and accordingly, ΔRp is small as 23.4 nm (39.9–16.5 nm) and 13.8 nm (39.7–25.9 nm) in a range of 20–60 mm in radius. Further, any value at each point in the range of 20–60 mm in a radial direction satisfied the relation of |Rph−Rpd|≦λ/16 NA in a flying height of 50 nm. In Comparative Example 15, Rp became smaller in comparison with the land/groove portions because the header area had no pit and groove. Therefore, ΔRp did not satisfy the relation of ΔRp≦λ/16 NA because of 39.2 nm (40.3−1.1 nm) in the range of 20–60 mm in radius. Further, output signals from the piezo element indicate excellent values such as 160 mV or less in the range of 20–60 mm in radius in Examples 20 and 21, and show that the fluctuation of the flying height of the head is small and stable flying characteristics are provided. On the other hand, in Comparative Example 15, the voltage values indicate that the intensity is twice or more as 340–380 mV and that the fluctuation of the flying height of the head is large because there is a large difference of Rp between the header area and the land/groove portions. In evaluation of SNR, Examples 20 and 21 showed excellent results as 25–27 dB in the range of 20–60 mm in radius. However, Comparative Examples 15 showed that noises became large due to a fluctuation of the flying height of the head, and SNR was low as 20 dB or less.

Example 22

A substrate of polycarbonate having a diameter of 130 mm and a thickness of 1.2 mm was prepared by attaching stampers each having a track pitch of 0.45 μm and a depth of groove of 65 nm in a land portion and a groove portion in the data area wherein a header area was 42 nm lower than the land portion, at both mirror plates of metallic dies and conducting injection-molding.

Figure 4:
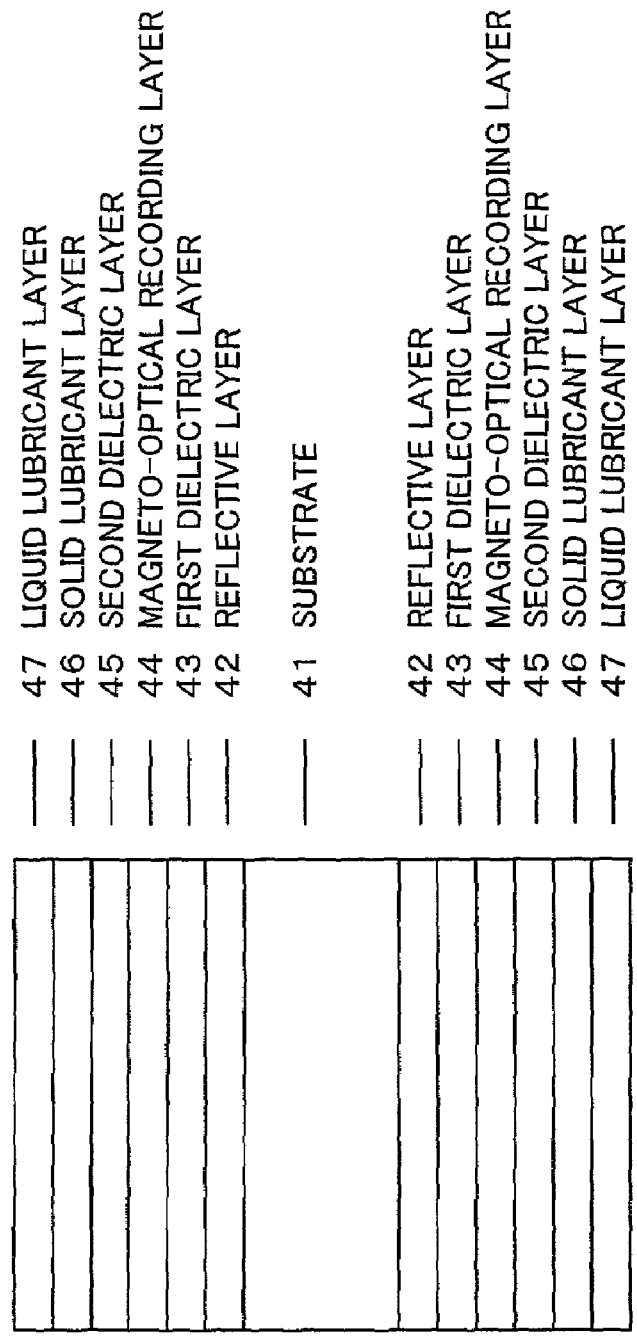
FIG. 4 is a cross-sectional view showing diagrammatically an embodiment of the construction of a double surface type magneto-optical recording disk of the present invention. The figure shows that a reflective layer 42, a first dielectric layer 43, a magneto-optical recording layer 44, a second dielectric layer 45, a solid lubricant layer 46 and a liquid lubricant layer 47 are formed in this order on each of an upper face and a lower face of a substrate 41.
Figure 5C:
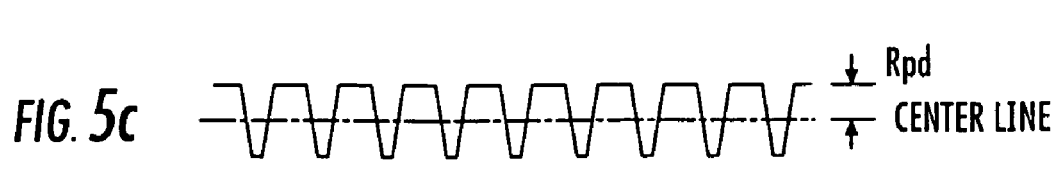
FIG. 5(c) is a cross-section taken along line A–A' of FIG. 5(b), where Rpd and the Center Line are shown.
Figure 5D:
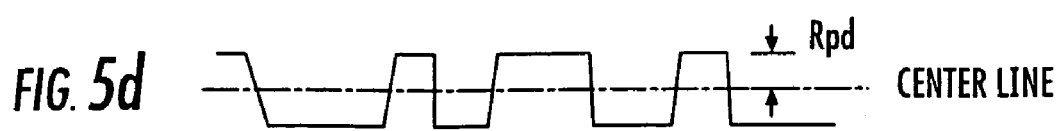
FIG. 5(d) is a cross-section taken along line B–B' of FIG. 5(b), where Rph and Center Line are shown.
Figure 6A:
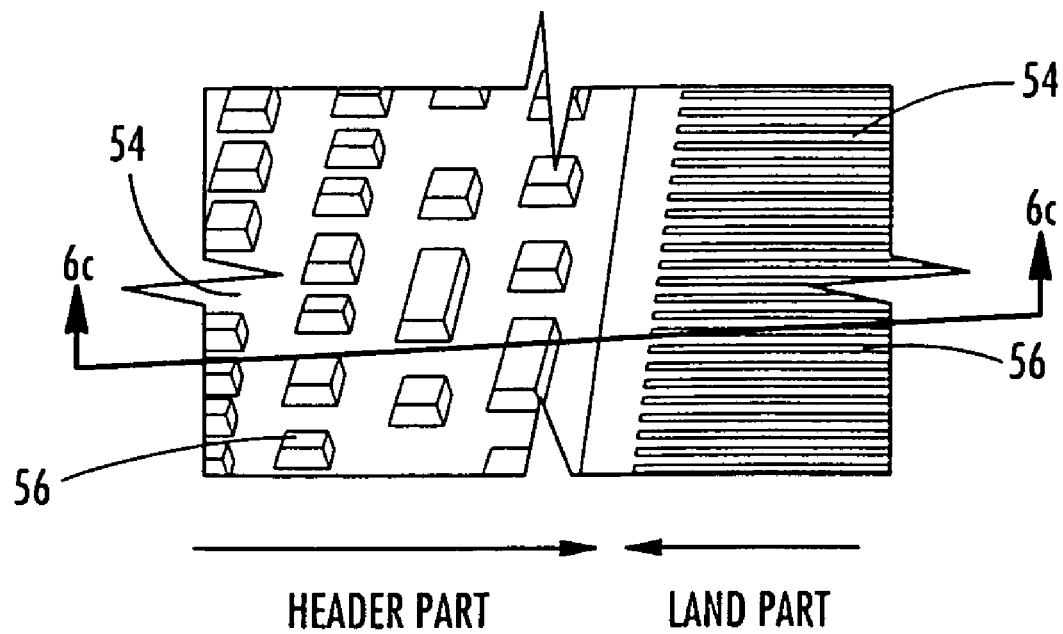
FIG. 6(a) illustrates a header part and a land part where black parts 54 representing concave or groove parts and white-gray parts 56 representing protruding parts as shown.
Figure 6B:
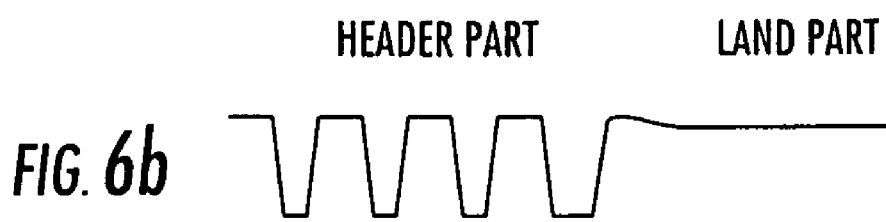
FIG. 6(b) is a cross-section taken along line C–C' of FIG. 6(a) showing the Header Part and the Land Part in the case of having a Header Part higher than a Land Part.
Figure 6C:
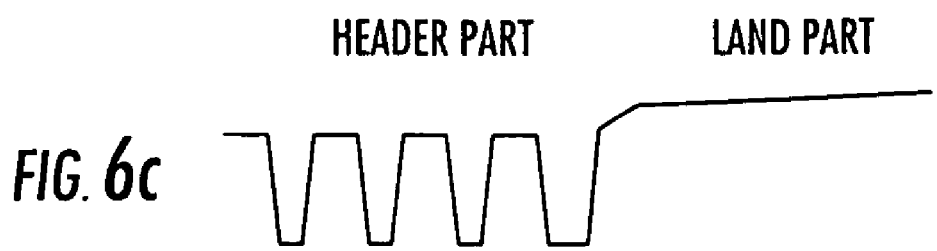
FIG. 6(c) is a cross-section taken along line C–C' of FIG. 6(a) showing a Header Part and a Land Part in the case of having a Header Part lower than a Land Part.

By using the substrate, a magneto-optical medium having a double surface structure as shown in FIG. 4 was prepared by the following method using sputtering methods.

Namely, on the substrate, an Al-3 wt % Cr alloy film (film thickness: 50 nm) as a reflective layer was formed by DC sputtering method. On this layer, a first dielectric layer of SiN was formed (in a thickness of 5 nm) by a reactive RF sputtering method using a Si target in an atmosphere of a mixture of Ar and $N_2$. On this, a magneto-optical recording layer of $Tb_{20}(Fe_{90}Co_{10})_{80}$ was formed (in a layer thickness of 20 nm) by DC sputtering method using simultaneously a Tb target and a $Fe_{90}Co_{10}$ target. On this, further, a second dielectric layer of SiN was formed (in a thickness of 30 nm) by a reactive RF sputtering method using a Si target in an atmosphere of a mixture of Ar and $N_2$. On this, a DLC layer having a refractive index of 1.85 at 633 nm was formed (in a layer thickness of 20 nm) by a reactive RF sputtering method using a C target in an atmosphere of a mixture of Ar and $CH_4$.

Then, a reflective layer, a first dielectric layer, a magneto-optical recording layer, a second dielectric layer and a DLC layer were formed on the opposite surface in the same manner as for the other surface.

After the formation of the DLC layer, a near-field magneto-optical recording medium was completed by lifting up the recording medium from a 0.01 wt % solution of piperonyl-modified perfluoropolyether ("Fomblin:AM2001," (tradename) manufactured by Ausimont Company) using a perfluoropolyether type solvent ("GALDEN SV-70" (tradename) manufactured by Ausimont Company) to form a lubricant layer having a thickness of 1.5 nm.

The layer thickness of the lubricant layer was calculated by using an X-ray photo-electron spectral method (XPS) and observing the ClS peak intensity.

Example 23

A substrate of polycarbonate having a diameter of 130 mm and a substrate thickness of 1.2 mm was prepared by attaching stampers each having a track pitch of 0.45 μm and a depth of groove of 65 nm in a land and a groove in the data area wherein the header area was 90 nm lower than the land portion at both mirror plates of metallic dies and conducting injection-molding. Then, a near-field magneto-optical recording medium was prepared by forming layers and coating a lubricant agent in the same manner as Example 22.

Comparative Example 16

A substrate of polycarbonate having a diameter of 130 mm and a thickness of 1.2 mm was prepared by attaching stampers each having a track pitch of 0.45 μm in a land portion and a groove portion in the data area wherein there was no difference of height between the data area and the header area at both mirror plates of metallic dies and conducting injection-molding. Then, a near-field magneto-optical recording medium was prepared by forming layers and coating a lubricant agent in the same manner as Example 22.

With respect to the thus obtained near-field magneto-optical recording disk, signals generated from the header area at the time when the optical head entered from the data area to the header area were observed by using a near-field magneto-optical recording medium evaluation device having a detector divided vertically in a beam propagating direction. As a result, signals at the time when the optical head entered into the header area could be detected as difference signals in the division type detector in Examples 22 and 23. However, in the disk of Comparative Example 16, any difference signal could not be detected, and the timing of the header area could not be obtained.

Example 24

A substrate of polycarbonate having a diameter of 130 mm and a substrate thickness of 1.2 mm was prepared by attaching stampers each having a track pitch of 0.45 μm and a depth of groove of 65 nm in a land and a groove in the data area wherein the header area was 30 nm higher than the land portion at both mirror plates of metallic dies, and conducting injection-molding.

By using the substrate, layers were formed on both surfaces of the substrate by the following method using sputtering methods.

First, an Al-3 wt % Cr alloy layer (layer thickness: 50 nm) as a reflective layer was formed by a DC sputtering method. On this, a first dielectric layer of SiN was formed (in a thickness of 5 nm) by a reactive RF sputtering method using a Si target in an atmosphere of a mixture of Ar and $N_2$. On this, a magneto-optical recording layer comprising $(Fe_{90}Co_{10})_{80}$ was formed (in a layer thickness of 20 nm) by the DC sputtering method using simultaneously a Tb target and a $Fe_{90}Co_{10}$ target. On this, further, a second dielectric layer of SiN was formed (in a layer thickness of 30 nm) by a reactive RF sputtering method using a Si target in an atmosphere of a mixture of Ar and $N_2$. On this, a DLC layer having a refractive index of 1.85 at 633 nm was formed (in a layer thickness of 20 nm) by a reactive RF sputtering method using a C target in an atmosphere of a mixture of Ar and $CH_4$.

Subsequently, a reflective layer, a first dielectric layer, a magneto-optical recording layer, a second dielectric layer and a DLC layer were formed on the opposite surface in the same manner as the above-mentioned surface.

After the formation of the DLC layer, a near-field magneto-optical recording medium was completed by lifting up the recording medium from 0.01 wt % solution of piperonyl-modified perfluoropolyether ("Fomblin:AM2001" (tradename) manufactured by Ausimont Company) using a perfluoropolyether type solvent ("GALDEN SV-70" (tradename) manufactured by Ausimont Company) to form a lubricant layer having a thickness of 1.5 nm.

The layer thickness of the lubricant layer was calculated by using an X-ray photoelectron spectral method (XPS) and observing the CiS peak intensity.

Example 25

A substrate of polycarbonate having a diameter of 130 mm and a substrate thickness of 1.2 mm was prepared by attaching stampers each having a track pitch of 0.45 μm and a depth of groove of 65 nm in a land and a groove in the data area wherein the header area was 85 nm higher than the land portion at both mirror plates of metallic dies and conducting injection-molding. Then, a near-field magneto-optical recording medium was prepared by forming layers and coating a lubricant agent in the same manner as Example 24.

Example 26

A substrate of polycarbonate having a diameter of 130 mm and a thickness of 1.2 mm was prepared by attaching stampers each having a track pitch of 0.45 μm in a land portion and a groove portion in the data area wherein there was no difference of height between the data area and the header area at both mirror surfaces of metallic dies and conducting injection-molding. Then, UV light from a high pressure mercury lamp was irradiated in an amount of an integrated light quantity of 1500 mJ/cm$^2$ in conversion into 365 nm.

In the measurement of the height of the land portion and the header area after the irradiation of UV, it was found that the header area was high by 18 nm.

By using the substrate, a near-field magneto-optical recording medium was prepared by forming layers and coating a lubricant agent in a same manner as Example 24.

Comparative Example 17

A substrate was formed by injection-molding according to Example 26 provided that no UV was irradiated. A near-field magneto-optical recording medium was prepared by forming layers and coating a lubricant agent on the substrate in the same manner as Example 24.

With respect to the thus obtained near-field magneto-optical recording disk, signals from the header area at the time when the optical head entered from the data area to the header area were observed by using a near-field magneto-optical recording medium evaluation device having a detector divided vertically in a beam propagating direction. As a result, signals at the time when the optical head entered into a header area could be detected as difference signals in the division type detector in Examples 24, 25 and 26. However, in the disk of Comparative Example 17, any difference signal could not be detected, and the timing of the header area could not be obtained.

Example 27

A substrate of polycarbonate having a diameter of 130 mm and a track pitch of 0.85 μm was prepared by injection-molding. Light from an ultra-high pressure mercury lamp (wavelength providing the strongest relative intensity: 436 nm) was irradiated for 30 sec to a groove surface (recording surface) side of the substrate.

A thermo-label was attached to the substrate under the same condition, and the surface temperature of the substrate was measured to find 105° C.

By using the substrate, layers were formed on the substrate by the following method using sputtering methods.

First, on the substrate, an Al-3 wt % Cr alloy layer (layer thickness: 50 nm) as a reflective layer was formed by a DC sputtering method. On this, a first dielectric layer of SiN was formed (in a thickness of 5 nm) by a reactive RF sputtering method using a C target in an atmosphere of a mixture of Ar and $N_2$. On this, a magneto-optical recording layer of $Tb_{20}(Fe_{90}Co_{10})_{80}$ was formed (in a layer thickness of 20 nm) by a DC sputtering method using simultaneously a Tb target and a $Fe_{90}Co_{10}$ target. On this, further, a second dielectric layer of SiN was formed (in a layer thickness of 30 nm) by a reactive RF sputtering method using a Si target in an atmosphere of a mixture of Ar and $N_2$. On this, a DLC layer having a refractive index of 1.85 at 633 nm was formed (in a layer thickness of 20 nm) by a reactive RF sputtering method using a C target in an atmosphere of a mixture of Ar and $CH_4$.

After the formation of the DLC layer, a near-field magneto-optical recording medium was completed by lifting up the recording medium from a 0.01 wt % solution of piperonyl-modified perfluoropolyether ("Fomblin:AM2001" (tradename) manufactured by Ausimont Company) using a perfluoropolyether type solvent ("GALDEN SV-70" (tradename) manufactured by Ausimont Company) to form a lubricant layer having a thickness of 1.5 nm.

The layer thickness of the lubricant layer was calculated by using an X-ray photo-electron spectral method (XPS) and observing the ClS peak intensity.

Then, the medium was set on a recording/reproducing evaluation device of an optical system of SIL head having a laser wavelength of 680 nm and an effective NA of 1.2 to evaluate the recording/reproducing characteristics. Recording was conducted to the medium by rotating the medium at a linear velocity of 7.0 m/s and irradiating laser adjusted so that the power was 6.0 mW in front of the objective lens while a magnetic field modulated to be a magnitude of ±150 Oe at a frequency of 7.0 MHz was applied from the coil of SIL head. Next, reproducing was conducted by irradiating laser so that the power was 1.0 mW in front of the objective lens, and the noise level and CNR of the recording medium were measured.

Further, a cross-cut peeling test was conducted to examine the adhesion strength of the recording layer.

The cross-cut peeling test was conducted by cutting 100 square areas with a knife, peeling off a tape, and counting the number of square areas remaining on the disk. A result is shown in Table 5.

TABLE 5

|  | C/N (dB) | Noise level (dBm) | Cross-cut peeling test |
|---|---|---|---|
| Example 27 | 43.4 | −59.2 | 100/100 |
| Example 28 | 44.2 | −60.1 | 100/100 |

TABLE 5-continued

|  | C/N (dB) | Noise level (dBm) | Cross-cut peeling test |
|---|---|---|---|
| Example 29 | 45.5 | −61.2 | 100/100 |
| Example 30 | 43.4 | −59.2 | 100/100 |
| Example 31 | 44.8 | −60.7 | 100/100 |
| Example 32 | 44.7 | −60.6 | 100/100 |
| Example 33 | 44.4 | −60.4 | 100/100 |
| Comparative Example 18 | 38.5 | −55.3 | 100/100 |
| Comparative Example 19 | 45.24 | −61.1 | 0/100 |

Example 28

A substrate of polycarbonate was prepared in the same manner as Example 27. Irradiation of light was conducted for 30 sec by using a flash UV lamp (wavelength providing the strongest relative intensity: 546 nm) to measure the surface temperature in the same manner as Example 27. The temperature was 102° C.

Further, a magneto-optical recording medium was prepared in the same manner as Example 27, and a cross-cut peeling test was conducted. Results are shown in Table 5.

Example 29

The irradiation of light, the measurement of the surface temperature and the preparation of a magneto-optical recording medium were conducted in the same manner as Example 27 except that a high pressure mercury lamp (wavelength providing the strongest relative intensity: 365 nm) was used as a light source. The measurements of noise level and CNR and a cross-cut peeling test were conducted in the same manner as Example 27. Results are shown in Table 5.

The surface temperature under these conditions was 110° C.

Example 30

The irradiation of light, the measurement of the surface temperature and the preparation of a magneto-optical recording medium were conducted in the same manner as Example 27 except that a metal halide lamp (wavelength providing the strongest relative intensity: 546 nm) was used as a light source. The measurements of noise level and CNR and a cross-cut peeling test were conducted in the same manner as Example 27. Results are shown in Table 5.

The surface temperature under these conditions was 110° C.

Example 31

The irradiation of light, the measurement of the surface temperature and the preparation of a magneto-optical recording medium were conducted in the same manner as Example 27 except that a arc lamp (wavelength providing the strongest relative intensity: 850 nm) was used as a light source. The measurements of noise level and CNR and a cross-cut peeling test were conducted in the same manner as Example 27. Results are shown in Table 5.

The surface temperature under these conditions was 120° C.

Example 32

The irradiation of light, the measurement of the surface temperature and the preparation of a magneto-optical recording medium were conducted in the same manner as Example 27 except that a fluorescent lamp (wavelength providing the strongest relative intensity: 630 nm) was used as a light source. The measurements of noise level and CNR and a cross-cut peeling test were conducted in the same manner as Example 27. Results are shown in Table 5.

The surface temperature under these conditions was 105° C.

Example 33

The irradiation of light, the measurement of the surface temperature and the preparation of a magneto-optical recording medium were conducted in the same manner as Example 27 except that a halogen lamp (wavelength providing the strongest relative intensity: 630 nm) was used as a light source. The measurements of noise level and CNR and a cross-cut peeling test were conducted in the same manner as Example 27. Results are shown in Table 5.

The surface temperature under these conditions was is 102° C.

Comparative Example 18

A substrate of polycarbonate prepared without irradiation of light was used, and a magneto-optical recording medium was prepared in the same manner as Example 27. The measurements of noise level and CNR and a cross-cut peeling test were conducted under the same conditions. Results are shown in Table 5.

Comparative Example 19

The irradiation of light, the measurement of the surface temperature and the preparation of a magneto-optical recording medium were conducted in the same manner as Example 27 except that a low pressure mercury lamp (wavelength providing the strongest relative intensity: 254 nm) was used as a light source. The measurements of noise level and CNR and a cross-cut peeling test were conducted in the same manner as Example 27. Results are shown in Table 5.

The surface temperature under these conditions was 1180° C.

What is claimed is:

1. An optical recording system comprising
   an optical recording medium and a flying optical head,
   wherein the optical recording medium comprises at least a land and a groove, which takes part in recording/reproducing, formed on a substrate, at least a reflective layer and a recording layer formed on the substrate in this order, and information-recording/reproducing is carried out by said flying optical head,
   wherein the depth from the maximum height of the land to the centerline of the land and the groove is represented by Rp and the flying height from the maximum height of the land to the optical head is represented by H in an optional length on the radius of the optical recording medium in a region for information-recording/reproducing, wherein Rp satisfies the relation of H>Rp>0.1 H, and
   wherein the optional length is 2–100 times as much as a track pitch.

2. The optical recording system according to claim 1, wherein the substrate is a light-irradiated thermoplastic plastic substrate, the irradiating light having the strongest relative intensity between the wavelengths of 350–1500 nm and being directed to a front surface at a side forming the recording layer of the thermoplastic plastic substrate.

3. The optical recording system according to claim 2, wherein the irradiated light is at least one light selected from the group consisting of super-high pressure mercury lamp, high pressure mercury lamp, flash UV lamp, metal halide lamp, fluorescent lamp, arc lamp and halogen lamp.

4. The optical recording medium according to claim 1, wherein the optional length is 10–50 times as much as the track pitch.

5. The optical recording medium according to claim 1, wherein $0.8\ H \geq R_p \geq 0.1\ H$.

6. The optical recording medium according to claim 5, wherein $0.5\ H \geq R_p \geq 0.1\ H$.

7. An optical recording medium comprising a substrate wherein at least a reflective layer and a recording layer are formed in this order on said substrate in which a land and a groove for data-recording/reproducing and a header area are provided, and information-recording/reproducing is carried out by an optical head, and wherein the optical recording medium being characterized in that when the effective numerical aperture of the optical head used is represented by NA, the wavelength of laser used is represented by $\lambda$, the depth from the maximum height of the surface of the recording medium to the centerline of the header is represented by Rph and the depth from the maximum height of the surface of the recording medium to the centerline of the land and the groove is represented by Rpd in an optional length on the radius of the optical recording medium in a region for information-recording/reproducing, the optical recording medium has a shape in its surface satisfying the relation of $\Delta Rp \leq \lambda/16\ NA$ where $\Delta Rp$ represents the absolute value obtained by subtracting the minimum value of Rpd from the maximum value of Rph or the absolute value obtained by subtracting the minimum value of Rph from the maximum value of Rpd, whichever is larger, the values of Rph and Rpd being obtained by measuring at plural positions.

8. The optical recording medium according to claim 7, wherein a format information is recorded in the header by means of convex bumps and/or concave pits.

9. The optical recording medium according to claim 7, wherein the convex bumps and/or concave pits are formed in the header so as to satisfy the relation of $(Rph-Rpd1 < \lambda/16\ NA$ where each value of Rph and Rpd is obtained by measuring at plural positions.

10. The optical recording medium according to claim 7, wherein a groove is formed in the header so as to satisfy the relation of $|Rph-Rpd| \leq \lambda/16\ NA$ where each value of Rph and Rpd is obtained by measuring at plural positions.

11. An optical recording medium comprising a substrate wherein at least a land portion and a groove portion, which takes part in recording/reproducing, and a header area for recording a format information are formed in said substrate;

wherein information is recorded in at least the land portion, and wherein the optical recording medium being characterized in that the height of the header area is different from the height of the land portion.

12. The optical recording medium according to claim 11, wherein the height of the header area is higher than the height of the land portion.

13. The optical recording medium according to claim 11, wherein the height of the header area is lower than the height of the land portion.

* * * * *